US011637319B2

(12) United States Patent
Peng et al.

(10) Patent No.: US 11,637,319 B2
(45) Date of Patent: Apr. 25, 2023

(54) ELECTROLYTIC SOLUTION AND ELECTROCHEMICAL DEVICE

(71) Applicant: NINGDE AMPEREX TECHNOLOGY LIMITED, Ningde (CN)

(72) Inventors: Xiexue Peng, Ningde (CN); Jiqiong Liu, Ningde (CN); Junfei Liu, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 299 days.

(21) Appl. No.: 16/652,390

(22) PCT Filed: Jan. 20, 2020

(86) PCT No.: PCT/CN2020/073179
§ 371 (c)(1),
(2) Date: Mar. 30, 2020

(87) PCT Pub. No.: WO2020/151651
PCT Pub. Date: Jul. 30, 2020

(65) Prior Publication Data
US 2021/0234196 A1    Jul. 29, 2021

(30) Foreign Application Priority Data

Jan. 25, 2019  (CN) .......................... 201910071428.8

(51) Int. Cl.
| | |
|---|---|
| H01M 10/0567 | (2010.01) |
| H01M 10/0525 | (2010.01) |
| H01M 10/0568 | (2010.01) |
| H01M 10/0569 | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 2006/0083992 A1 | 4/2006 | Nakanishi et al. | |
| 2012/0082890 A1* | 4/2012 | Dong .................. | H01M 50/414 429/188 |
| 2013/0280622 A1* | 10/2013 | Tokuda ............. | H01M 10/0525 429/339 |
| 2018/0233778 A1 | 8/2018 | Park et al. | |

FOREIGN PATENT DOCUMENTS

| | | |
|---|---|---|
| CN | 1976113 A | 6/2007 |
| CN | 101454938 A | 6/2009 |
| CN | 102746330 A | 10/2012 |
| CN | 102964372 A | 3/2013 |
| CN | 103765662 A | 4/2014 |
| CN | 103855426 A | 6/2014 |
| CN | 104025353 A | 9/2014 |
| CN | 104649932 A | 5/2015 |
| CN | 104752766 A | 7/2015 |
| CN | 104852087 A | 8/2015 |
| CN | 105051964 A | 11/2015 |
| CN | 105428701 A | 3/2016 |
| CN | 105514487 A | 4/2016 |
| CN | 105895955 A | 8/2016 |
| CN | 105895957 A | 8/2016 |
| CN | 106340671 A | 1/2017 |
| CN | 106654128 A | 5/2017 |
| CN | 107394269 A | 11/2017 |
| CN | 107403956 A | 11/2017 |
| CN | 108091932 A | 5/2018 |
| CN | 108232300 A | 6/2018 |
| CN | 109244529 A | 1/2019 |
| CN | 109256586 A | 1/2019 |
| CN | 109786834 A | 5/2019 |
| EP | 3407414 A1 | 11/2018 |
| JP | H03236169 A | 10/1991 |
| JP | 2009004352 A | 1/2009 |
| WO | 2014036026 A1 | 3/2014 |

OTHER PUBLICATIONS

Machine translation of Du et al. (CN 109244529 A). (Year: 2021).*
"High Voltage Performances of Li2NiPO4F Cathode with Dinitrile-Based Electrolytes," Nagahama et al., Journal of The Electrochemical Society, 157 (6) A748-A752 (2010).
"Sulfone-Based Electrolytes for Lithium-Ion Batteries," Xu et al., Journal of The Electrochemical Society, 149 (7) A920-A926 (2002).
"Silicon-Containing Carbonates—Synthesis, Characterization, and Additive Effects for Silicon-Based Polymer Electrolytes," Rossi et al., Springer Science + Business Media, 2010, pp. 201-208, 8 pages in English.
International Search Report dated Apr. 20, 2020 in counterpart PCT application PCT/CN2020/073179, 5 pages.
"A Green Route: From Carbon Dioxide to Silyl Substituted Carbonate Electrolytes for Lithium-Ion Batteries," Philipp et al., Journal of the Electrochemical Society162 (7) (2015), pp. A1319-A1326.
Extended European Search Report dated Nov. 29, 2022 in counterpart European application EP20712433.0, 4 pages.

* cited by examiner

*Primary Examiner* — Eli S Mekhlin
(74) *Attorney, Agent, or Firm* — Juan Carlos A. Marquez; Marquez IP Law Office, PLLC

(57) ABSTRACT

The present application relates to an electrolytic solution and an electrochemical device comprising the electrolytic solution. The electrolytic solution comprises a carbonate compound having a silicon-containing functional group, so as to significantly improve the overcharge performance and high-temperature storage performance of an electrochemical device using the electrolytic solution.

20 Claims, No Drawings

ELECTROLYTIC SOLUTION AND ELECTROCHEMICAL DEVICE

The present application is a National Stage application of PCT international application: PCT/CN2020/073179 which claims the benefit of priority from China Patent Application No. 201910071428.8, filed on 25 Jan. 2019, the disclosure of which is hereby incorporated by reference in its entirety.

BACKGROUND OF THE INVENTION

1. Field of the Invention

The present application relates to the technical field of electrochemical devices, and more particularly to an electrolytic solution and an electrochemical device containing the electrolytic solution.

2. Description of the Related Art

Electrochemical devices (for example, lithium-ion batteries) have become available in our daily lives with the advances in technology and raised environmental protection requirements. Due to the high energy density, low maintenance, relatively low self-discharge, long cycle life, being free of memory effect, high operating voltage, environmental protection, and other characteristics, lithium-ion batteries have received great attention and have found wide use in smart products (including mobile phones, notebooks, cameras and other electronic products), power tools and electric vehicles, and are gradually replacing traditional Ni—Cd and MH-Ni batteries. However, as electronic products become smaller, and more portable, increasingly higher requirements are imposed on lithium ion batteries. It is imperative to develop a product that is safe and capable of withstanding high temperatures, over charge and various harsh conditions. How to solve the safety problem of lithium ion batteries while taking into account the problem associated with cycle performance has always been an afflicting difficultly.

SUMMARY

An embodiment of the present application provides an electrolytic solution and an electrochemical device containing the electrolytic solution, to solve to some extent at least one of the problems existing in related art. The electrolytic solution is characterized by comprising a carbonate compound having a silicon-containing functional group. The electrolytic solution can significantly improve the overcharge performance and high-temperature storage performance of an electrochemical device using it.

According to an embodiment of the present application, the present application provides an electrolytic solution comprising a carbonate compound having a silicon-containing functional group.

According to an embodiment of the present application, the carbonate compound having a silicon-containing functional group includes a compound of Formulas (I-A), a compound of (II-A), a compound of (II-B), a compound of (II-C) or any combination thereof:

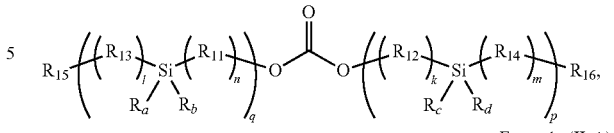

Formula (I-A)

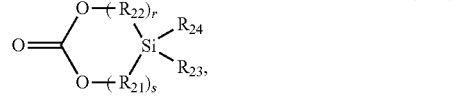

Formula (II-A)

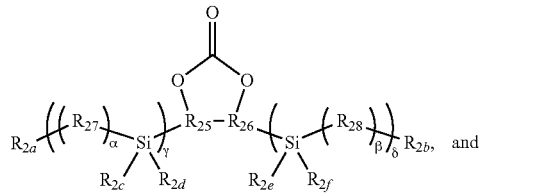

Formula (II-B)

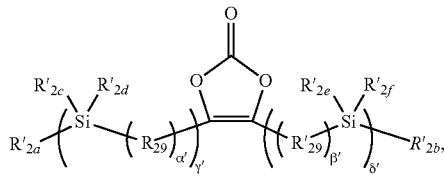

Formula (II-C)

wherein $R_{11}$, $R_{12}$, $R_{13}$, $R_{14}$, $R_{21}$, $R_{22}$, $R_{27}$, $R_{28}$, $R_{29}$, and $R'_{29}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano; n, m, l, k, r, s, α, β, α', and β' are each independently selected from 0 or 1, and r, and s are not 0 simultaneously; $R_{15}$, $R_{16}$, $R_{23}$, $R_{24}$, $R_{2a}$, $R_{2b}$, $R'_{2a}$, $R'_{2b}$, $R_a$, $R_b$, $R_c$, $R_d$, $R_{2c}$, $R_{2d}$, $R_{2c}$, $R_{2f}$, $R_{2c}$, $R'_{2d}$, $R'_{2e}$, and $R_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_{3-10}$ cycloalkyl group, and when substituted, the substituent is at least one of halogen, $C_1$-$C_6$ alkyl, $C_2$-$C_6$ alkenyl, and cyano; p, q, γ, δ, γ', and δ' are each independently an integer selected from 0 to 3; each number of Si in the compounds of Formulas (I-A), (II-A), (II-B) and (II-C) is 1 to 6; $R_{25}$ and $R_{26}$ are each independently selected from a substituted or unsubstituted $C_1$-$C_6$ alkylidene group or a substituted or unsubstituted $C_2$-$C_6$ alkenyl group, and when substituted, the substituent is at least one selected from halogen, $C_1$-$C_6$ alkyl, and $C_2$-$C_6$ alkenyl; $R_d$ and $R_{16}$, together with Si to which they are attached, optionally form a ring; when l is 0, $R_a$, $R_b$ and $R_{15}$ are not hydrogen simultaneously; when m is 0, $R_c$, $R_d$ and $R_{16}$ are not hydrogen simultaneously; when α is 0, $R_{2a}$, $R_{2c}$ and $R_{2d}$ are not hydrogen simultaneously; when β is 0, $R_{2b}$, $R_{2c}$ and $R_{2f}$ are not hydrogen simultaneously; $R'_{2c}$, $R'_{2d}$ and $R'_{2a}$ are not hydrogen simultaneously; and $R'_{2e}$, $R'_{2f}$ and $R'_{2b}$ are not hydrogen simultaneously.

According to an embodiment of the present application, the compound of Formula (I-A), the compound of Formula (II-A), the compound of Formula (II-B) or the compound of Formula (II-C) is at least on selected from:

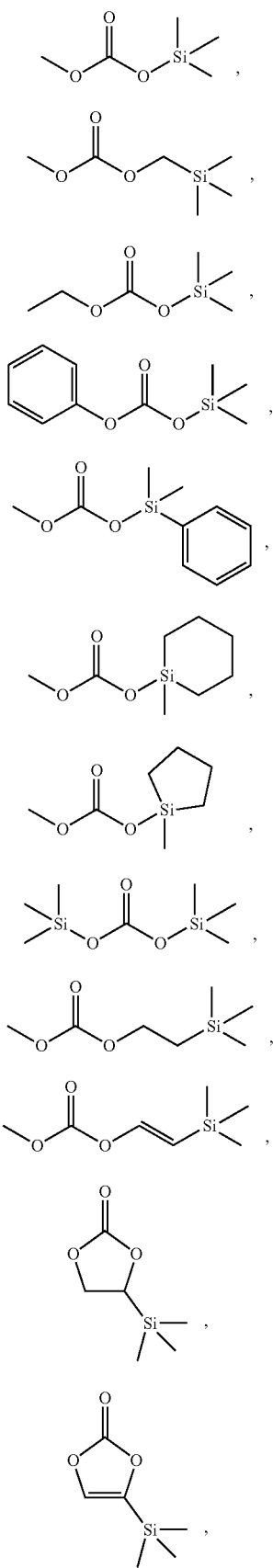

Formula (I-1)
Formula (I-2)
Formula (I-3)
Formula (I-4)
Formula (I-5)
Formula (I-6)
Formula (I-7)
Formula (I-8)
Formula (I-9)
Formula (I-10)

Formula (II-1)

Formula (II-2)

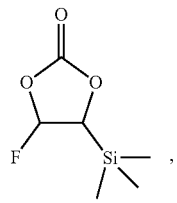

Formula (II-3)

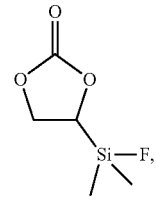

Formula (II-4)

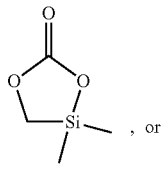

Formula (II-5)

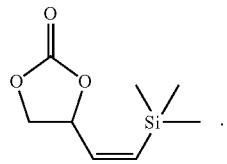

, or

Formula (II-6)

According to an embodiment of the present application, the weight percentage of the carbonate compound having a silicon-containing functional group is from about 0.005 wt % to about 70 wt %.

According to an embodiment of the present application, the electrolytic solution further comprises a compound having a sulfur-oxygen double bond. The compound having a sulfur-oxygen double bond includes a compound of Formula (III-A), a compound of Formula (III-B), or any combination thereof:

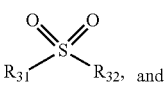

Formula (III-A)

Formula (III-B)

wherein $R_{31}$ and $R_{32}$ are each independently selected from a substituted or unsubstituted $C_1$-$C_5$ alkyl group, a substituted or unsubstituted $C_2$-$C_{10}$ alkenyl group, a substituted or unsubstituted $C_6$-$C_{10}$ aryl group or a substituted or unsubstituted $C_1$-$C_{10}$ alkyl group containing a heteroatom, and the heteroatom is selected from O, S, and P, and the substituent is one or more of halogen, nitro, cyano, carboxyl, and a sulfate group; and $R_{33}$ and $R_{34}$ are each independently selected from a substituted or unsubstituted $C_1$-$C_4$ alkylene group, a substituted or unsubstituted $C_2$-$C_4$ alkenyl group, or a substituted or unsubstituted $C_1$-$C_6$ alkylene group containing a heteroatom, and when substituted, the substituent is at least one selected from halogen, $C_1$-$C_3$ alkyl, and $C_2$-$C_4$ alkenyl, and the heteroatom is selected from O, S, and P. The weight percentage of the compound having a sulfur-oxygen double bond in the electrolytic solution is from about 0.01 wt % to about 10 wt %.

According to an embodiment of the present application, the compound having a sulfur-oxygen double bond is at least one selected from:

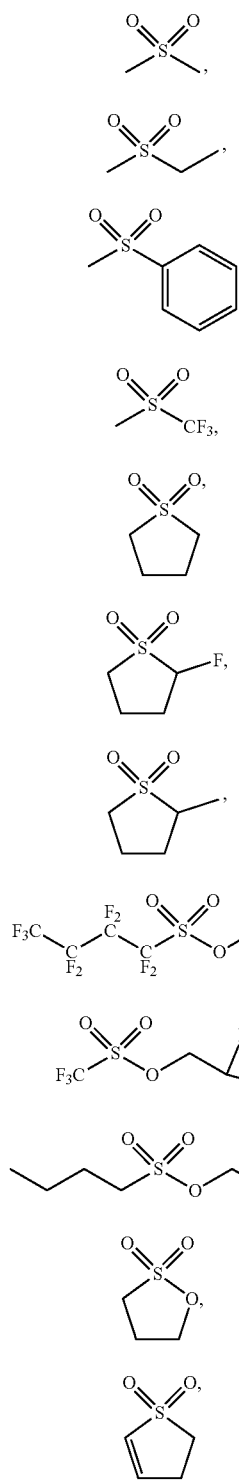

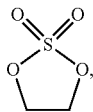

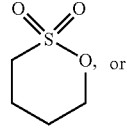

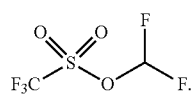

According to an embodiment of the present application, the electrolytic solution further comprises a cyclic carbonate compound, which is a compound of Formula (IV-A):

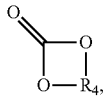

wherein $R_4$ is a substituted or unsubstituted $C_2$-$C_6$ alkylene group or a substituted or unsubstituted $C_2$-$C_6$ alkenyl group, and when substituted, the substituent is at least one selected from halogen, $C_1$-$C_6$ alkyl, and $C_2$-$C_6$ alkenyl. The weight percentage of the cyclic carbonate compound in the electrolytic solution is from about 0.01 wt % to about 30 wt %.

According to an embodiment of the present application, the electrolytic solution further comprises an aromatic compound, which is a compound of Formula (V-A):

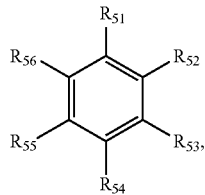

wherein $R_{51}$, $R_{52}$, $R_{51}$, $R_{54}$, $R_{55}$ and $R_{56}$ are each independently selected from hydrogen, fluorine, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_2$-$C_{10}$ alkenyl group, a substituted or unsubstituted $C_6$-$C_{10}$ aryl group or a substituted or unsubstituted $C_3$-$C_6$ heterocyclic group, and the heteroatom in the heterocyclic group is selected from O, S, and P, and when substituted, the substituent is at least one of halogen, cyano, carboxyl, and a sulfate group.

According to an embodiment of the present application, the aromatic compound is at least one selected from 2-methylbiphenyl, 2-ethylbiphenyl, terphenyl, partially hydrogenated terphenyl, cyclopentylbenzene, tert-butylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, diphenyl ether, dibenzofuran, fluorobenzene, toluene, 2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexylfluorobenzene, p-cyclohexylfluorobenzene, 2,4-difluoroanisole, 2,5-difluoroanisole, 2,6-difluoroanisole, and 3,5-difluoroanisole. The weight percentage of the aromatic compound in the electrolytic solution is from about 1 wt % to about 20 wt %.

According to an embodiment of the present application, the electrolytic solution further comprises a nitrile compound. The nitrile compound includes a compound of Formula (VI-A), a compound of Formula (VI-B), or any combination thereof:

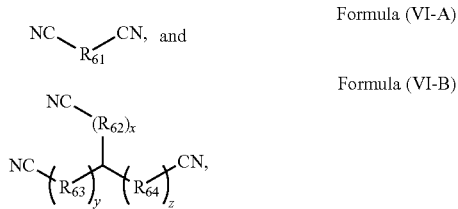

Formula (VI-A)

Formula (VI-B)

wherein $R_{61}$ is at least one selected from a substituted or unsubstituted $C_1$-$C_{10}$ alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group or a substituted or unsubstituted $C_6$-$C_{10}$ cycloalkyl group, and the substituent is at least one of halogen. $C_1$-$C_6$ alkyl, $C_2$-$C_6$ alkenyl, and cyano; $R_{62}$, $R_{63}$, and $R_{64}$ are each independently selected from a substituted or unsubstituted $C_1$-$C_{10}$ alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group, a substituted or unsubstituted $C_6$-$C_{10}$ cycloalkyl group or a substituted or unsubstituted $C_3$-$C_6$ heterocyclic group, and the heteroatom in the heterocyclic group is selected from O, S, and P; x, y, and z are each independently selected from 0 or 1, and when substituted, the substituent is at least one of halogen, $C_1$-$C_6$ alkyl, $C_2$-$C_6$ alkenyl, and cyano.

According to an embodiment of the present application, the nitrile compound is at least one selected from methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,9-bis(2-cyanoethyl)-2,4,8,10-tetraoxaspiro[5,5]undecane, 1,2,3-propane tricarbonitrile, 1,3,5-pentane tricarbonitrile, 1,3,6-hexane tricarbonitrile, 1,2,3-tris(2-cyanoethoxy)propane, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene. The weight percentage of the nitrile compound in the electrolytic solution is from about 0.01 wt % to about 20 wt %.

According to an embodiment of the present application, the present application provides an electrochemical device comprising a cathode, an anode, a separator disposed between the cathode and the anode, and an electrolytic solution which is any one as described above.

Additional aspects and advantages of the embodiments of the present application will be partially described, illustrated or explained by way of examples in the description which follows.

DETAILED DESCRIPTION

To make the object, technical solutions and advantages of the present application clearer, the technical solutions of the present application will be clearly and completely described in the following with reference to the embodiments of the present application. Apparently, the embodiments described are some preferred embodiments, rather than all of the embodiments of the present application. All other embodiments obtained by a person of skill in the art without creative efforts based on the technical solutions and embodiments provided in the present application shall fall within the protection scope of the present application. The embodiments of the present application should not be construed as limiting the present application.

As used herein, the terms "include", "comprise" and "contain" are used in their open, non-limiting sense.

The term "about" is used to describe and illustrate small changes. When being used in connection with an event or circumstance, the term may refer to an example in which the event or circumstance occurs precisely, and an example in which the event or circumstance occurs approximately. For example, when being used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

In the detailed description and claims, a list of items connected by the term "one of" or the like means any one of the listed items. For example, if items A and B are listed, the phrase "one of A and B" means only A or only B. In another example, if items A, B, and C are listed, then the phrase "one of A, B, and C" means only A; only B; or only C. Item A may include a single or multiple elements. Item B may include a single or multiple elements. Item C may include a single or multiple elements.

In the detailed description and claims, a list of items connected by the term "at least one of" or the like means any combination of the listed items. For example, if items A and B are listed, the phrase "at least one of A and B" means only A; only B; or A and B. In another example, if items A, B, and C are listed, then the phrase "at least one of A, B, and C" means only A; only B; only C; A and B (excluding C); A and C (excluding B); B and C (excluding A); or A, B, and C. Item A may include a single or multiple elements. Item B may include a single or multiple elements. Item C may include a single or multiple elements.

As used herein, "hydrocarbyl group" encompasses alkyl, alkenyl, and alkynyl groups. For example, the hydrocarbyl group is intended to be a straight-chain hydrocarbon structure having 1 to 20 carbon atoms. The hydrocarbyl group is also intended to be a branched or cyclic hydrocarbon structure having 3 to 20 carbon atoms. When a hydrocarbyl group having a specific number of carbon atoms is defined, it is intended to cover all geometric isomers having the carbon number. The hydrocarbyl group herein may also be a hydrocarbyl group having 1 to 15 carbon atoms, a hydrocarbyl group having 1 to 10 carbon atoms, a hydrocarbyl group having 1 to 5 carbon atoms, a hydrocarbyl group having 5 to 20 carbon atoms, a hydrocarbyl group having 5 to 15 carbon atoms or a hydrocarbyl group having 5 to 10 carbon atoms. Additionally, the hydrocarbyl group can be optionally substituted. For example, the hydrocarbyl group may be substituted by halogen including fluorine, chlorine, bromine, and iodine, an alkyl group, an aryl group or a heteroaryl group.

As used herein, the "alkyl group" is intended to be a linear saturated hydrocarbon structure having 1 to 20 carbon atoms. The alkyl group is also intended to be a branched or cyclic hydrocarbon structure having 3 to 20 carbon atoms. For example, the alkyl group may be an alkyl group having 1-20 carbon atoms, an alkyl group having 1-10 carbon atoms, an alkyl group having 1-5 carbon atoms, an alkyl group having 5-20 carbon atoms, an alkyl group having 5-15 carbon atoms, or alkyl group having 5-10 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group can be optionally substituted.

As used herein, the term "alkylene group" means a linear or branched divalent saturated hydrocarbyl group. For example, the alkylene group may be an alkylene group having 1-20 carbon atoms, an alkylene group having 1-15 carbon atoms, an alkylene group having 1-10 carbon atoms, an alkylene group having 1-5 carbon atoms, an alkylene group having 5-20 carbon atoms, an alkylene group having 5-15 carbon atoms, or alkylene group having 5-10 carbon atoms. A representative alkylene group includes (for example) methylene, ethane-1,2-diyl ("ethylene"), propane-1,2-diyl, propane-1,3-diyl, butane-1,4-diyl, pentane-1,5-diyl and the like. Additionally, the alkylene group can be optionally substituted.

As used herein, the term "alkylidene group" means a linear or branched trivalent saturated hydrocarbyl group. For example, the alkylidene group may be an alkylidene group having 1-20 carbon atoms, an alkylidene group having 1-15 carbon atoms, an alkylidene group having 1-10 carbon atoms, an alkylidene group having 1-5 carbon atoms, an alkylidene group having 5-20 carbon atoms, an alkylidene group having 5-15 carbon atoms, or an alkylidene group having 5-10 carbon atoms. A representative alkylidene group includes, for example, methylidene (—CH—), ethane-1,1,2-triyl (—CHCH$_2$—), propane-1,2,2-triyl, propane-1,1,3-triyl, butane-1,1,4-triyl, pentane-1,1,5-triyl and the like. Additionally, the alkylidene group can be optionally substituted.

As used herein, the term "alkenyl group" means a linear or branched trivalent alkenyl group. When an alkenyl group having a specific number of carbon atoms is defined, it is intended to cover all geometric isomers having the carbon number. For example, the alkenyl group may be an alkenyl group having 2-20 carbon atoms, an alkenyl group having 2-15 carbon atoms, an alkenyl group having 2-10 carbon atoms, an alkenyl group having 2-5 carbon atoms, an alkenyl group having 5-20 carbon atoms, an alkenyl group having 5-15 carbon atoms, or an alkenyl group having 5-10 carbon atoms. A representative alkenyl group includes (for example) ethenylidene

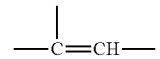

propene-1,1,3-triyl

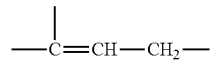

propene-1,2,2-triyl, propene-1,3,3-triyl, butene-1,1,4-triyl, pentene-1,1,5-triyl, and the like. Additionally, the alkenyl group can be optionally substituted.

As used herein, the term "alkenyl group" encompasses both linear and branched alkenyl groups. When an alkenyl group having a specific number of carbon atoms is defined, it is intended to cover all geometric isomers having the carbon number. For example, the alkenylele group may be an alkenyl group having 2-20 carbon atoms, an alkenyl group having 2-15 carbon atoms, an alkenyl group having 2-10 carbon atoms, an alkenyl group having 2-5 carbon atoms, an alkenyl group having 5-20 carbon atoms, an alkenyl group having 5-15 carbon atoms, or alkenyl group having 5-10 carbon atoms. A representative alkenyl group includes (for example) ethenylene, propenylene, butenylene and the like. Additionally, the alkenyl group can be optionally substituted.

As used herein, the term "aryl" encompasses both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. A representative aryl group includes (for example) phenyl, methylphenyl, propylphenyl, isopropylphenyl, benzyl and naphthalen-1-yl, naphthalen-2-yl and the like. Additionally, the aryl group can be optionally substituted.

As used herein, the term "heteroaryl group" may encompass a monocyclic heteroaromatic group which may include one to three heteroatoms, for example, pyrrole, furan, thiophene, imidazole, oxazole, thiazole, triazole, pyrazole, pyridine, pyrazine, pyrimidine, and the like. The term heteroaryl group also includes a polycyclic heteroaromatic system having two or more rings in which two atoms are shared by two adjacent rings (where the ring is "fused"), in which at least one of the rings is a heteroaryl group, and other rings may be a cycloalkyl group, a cycloalkenyl group, an aryl group, a heterocyclyl group and/or a heteroaryl group. The heteroatom in the heteroaryl group may be for example O, S, N, P, and so on. For example, the heteroaryl group may be a $C_6$-$C_{50}$ heteroaryl group, a $C_6$-$C_{40}$ heteroaryl group, a $C_6$-$C_{30}$ heteroaryl group, a $C_6$-$C_{20}$ heteroaryl group, or a $C_6$-$C_{10}$ heteroaryl group. Additionally, the aryl group can be optionally substituted. Additionally, as used herein, the term "halogen" may be F, Cl, Br or I.

I. ELECTROLYTIC SOLUTION

The present application provides an electrolytic solution comprising an organic solvent, an electrolyte, and additives. In some embodiments, the electrolytic solution is a non-aqueous electrolytic solution.

1. Additives

Carbonate Compound Having a Silicon-Containing Functional Group

The present application provides an electrolytic solution comprising a carbonate compound having a silicon-containing functional group.

In some embodiments, the carbonate compound having a silicon-containing functional group may include a compound of Formula (I-A), a compound of (II-A), a compound of (II-B), a compound of (II-C), or any combination thereof:

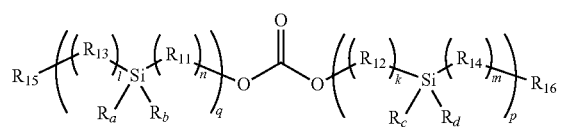

Formula (I-A)

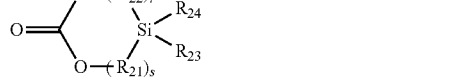

Formula (II-A)

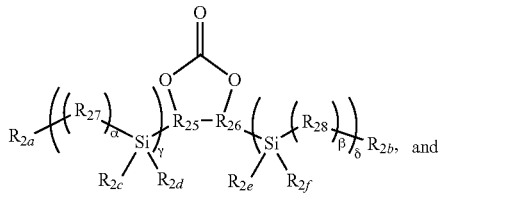

Formula (II-B)

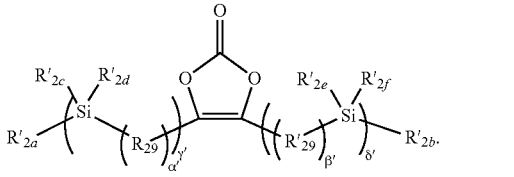

Formula (II-C)

In Formula (I-A), $R_{11}$, $R_{12}$, $R_{13}$, and $R_{14}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; n, m, l, and k are each independently selected from 0 or 1; $R_a$, $R_b$, $R_c$, $R_d$, $R_{15}$ and $R_{16}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_1$-$C_{10}$ aryl group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; when l is 0, $R_a$, $R_b$ and $R_{15}$ are not hydrogen simultaneously; when m is 0, $R_c$, $R_d$ and $R_{16}$ are not hydrogen simultaneously; p and q are each independently an integer selected from 0 to 3; the number of Si in the compound of Formula (I-A) is 1 to 6; and $R_d$ and $R_{16}$, together with Si to which they are attached, may form a ring.

In Formula (II-A), $R_{21}$ and $R_{22}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; r and s are each independently selected from 0 or 1, and r and s are not 0 simultaneously; and $R_{23}$ and $R_{24}$ are each independently selected from a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group, or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano.

In Formula (II-B), $R_{27}$ and $R_{28}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; a and are each independently selected from 0 or; $R_{2a}$, $R_{2b}$, $R_{2c}$, $R_{2d}$, $R_{2e}$, and $R_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; when a is 0, $R_{2a}$, $R_{2c}$ and $R_{2d}$ are not hydrogen simultaneously; when β is 0, $R_{2b}$, $R_{2e}$, and $R_{2f}$ are not hydrogen simultaneously; γ and δ are each independently an integer selected from 0 to 3; the number of Si in the compound of Formula (II-B) is 1 to 6; and $R_{25}$ and $R_{26}$ are each independently selected from a substituted or unsubstituted $C_1$-$C_6$ alkylidene group or a substituted or unsubstituted $C_2$-$C_6$ alkenyl group, in which when substituted, the substituent is at least one selected from halogen, $C_1$-$C_6$ alkyl, and $C_2$-$C_6$ alkenyl.

In Formula (II-C), $R_{29}$ and $R'_{29}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, wherein when substituted, the substituent is at least one of halogen, $C_1$-$C_6$ alkyl, $C_2$-$C_6$ alkenyl, and cyano; α' and β' are each independently selected from 0 or 1; $R'_{2c}$, $R'_{2d}$, $R'_{2e}$, $R'_{2f}$, $R'_{2a}$ and $R'_{2b}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl, wherein when substituted, the substituent is at least one of halogen, $C_1$-$C_6$ alkyl, $C_2$-$C_6$ alkenyl, and cyano; $R'_{2c}$, $R'_{2d}$ and $R'_{2a}$ are not hydrogen simultaneously, and $R'_{2e}$, $R'_{2f}$ and $R'_{2b}$ are not hydrogen simultaneously; γ' and δ' are each independently an integer selected from 0 to 3; and the number of Si in the compound of Formula (II-C) is 1 to 6. In some embodiments, the carbonate compound having a silicon-containing functional group is a compound of Formula (I-A), the compound of (II-A), the compound of (II-B) or the compound of (II-C).

In some embodiments, the compound of Formula (I-A), the compound of (II-A), the compound of (II-B) or the compound of (II-C) contains 1 or 2 Si atoms.

In some embodiments, the carbonate compound having a silicon-containing functional group is at least one selected from:

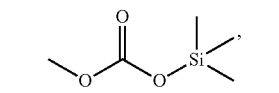
Formula (I-1)

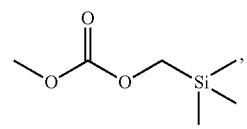
Formula (I-2)

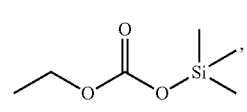
Formula (I-3)

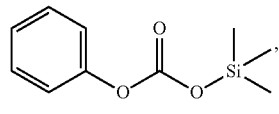
Formula (I-4)

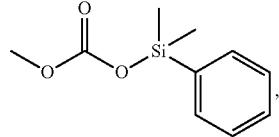
Formula (I-5)

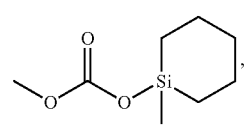
Formula (I-6)

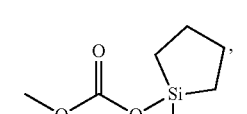
Formula (I-7)

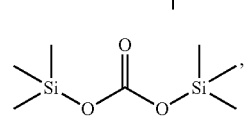
Formula (I-8)

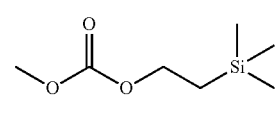
Formula (I-9)

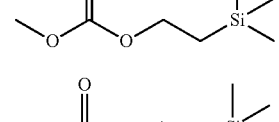
Formula (I-10)

-continued

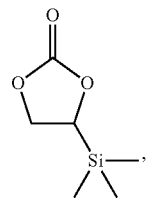
Formula (II-1)

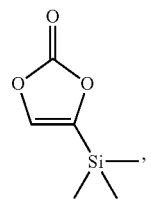
Formula (II-2)

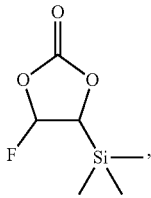
Formula (II-3)

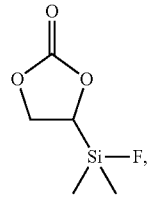
Formula (II-4)

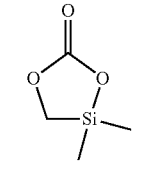
Formula (II-5)

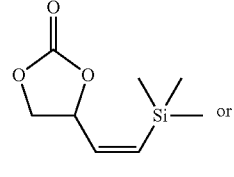
Formula (II-6)

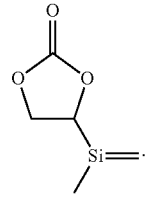
Formula (II-7)

In some embodiments, the weight percentage (wt %) of the carbonate compound having a silicon-containing functional group is from about 0.005 wt % to about 70 wt %. In some embodiments, the weight percentage (wt %) of the carbonate compound having a silicon-containing functional group is about 1 wt % to about 30 wt %, about 1 wt % to about 10 wt %, about 5 wt % to about 10 wt %, about 5 wt % to about 30 wt %, about 10 wt % to about 30 wt %, about 20 wt % to about 30 wt % or about 30 wt % to about 70 wt %.

The carbonate compound having a silicon-containing functional group has excellent chemical stability, low surface tension, thermal stability, and oxidation resistance. Due to these properties, the carbonate compound having a silicon-containing functional group can form a stable protection film on the electrode surface, thereby alleviating the heat generation resulting from decomposition of the electrolytic solution on the electrode surface during the overcharge process of the lithium ion battery, so as to improve the overcharge performance and high-temperature storage performance of the lithium ion battery.

Compound Having a Sulfur-Oxygen Double-Bond

In some embodiments, the electrolytic solution of the present application may further comprise a compound having a sulfur-oxygen double bond, to enhance the protection of the active material. The compound having a sulfur-oxygen double bond includes a compound of Formula (III-A), a compound of Formula (III-B), or any combination thereof:

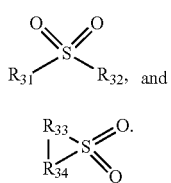

Formula (III-A)

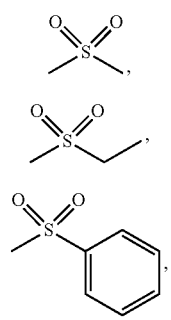

Formula (III-B)

In Formula (III-A), $R_{31}$ and $R_{32}$ are each independently selected from a substituted or unsubstituted $C_1$-$C_5$ alkyl group, a substituted or unsubstituted $C_2$-$C_{10}$ alkenyl group, a substituted or unsubstituted $C_6$-$C_{10}$ aryl group or a substituted or unsubstituted $C_1$-$C_{10}$ alkyl group containing a heteroatom, wherein the heteroatom is selected from O, S, and P, and when substituted, the substituent is one or more of halogen, nitro, cyano, carboxyl, and a sulfate group.

In Formula (III-B), $R_{33}$ and $R_{34}$ are each independently selected from a substituted or unsubstituted $C_1$-$C_4$ alkylene group, a substituted or unsubstituted $C_2$-$C_4$ alkenyl group or a substituted or unsubstituted $C_1$-$C_6$ alkylene group containing a heteroatom, wherein when substituted, the substituent is at least one selected from halogen, $C_1$-$C_3$ alkyl, and $C_2$-$C_4$ alkenyl, and the heteroatom is selected from O, S, and P.

In some embodiments, the compound having a sulfur-oxygen double bond may be a compound of Formula (III-A) or a compound of Formula (III-B).

In some embodiments, the compound having a sulfur-oxygen double bond is at least one selected from:

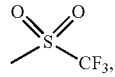

Formula (III-1)

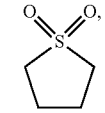

Formula (III-2)

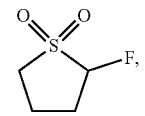

Formula (III-3)

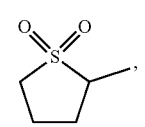

Formula (III-4)

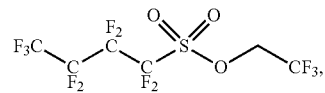

Formula (III-5)

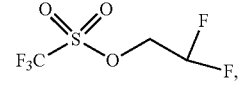

Formula (III-6)

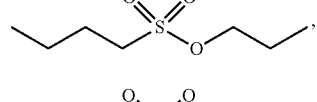

Formula (III-7)

Formula (III-8)

Formula (III-9)

Formula (III-10)

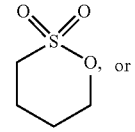

Formula (III-11)

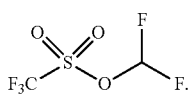

Formula (III-12)

Formula (III-13)

Formula (III-14)

, or

Formula (III-15)

.

In some embodiments, the weight percentage of the compound having a sulfur-oxygen double bond in the electrolytic solution is from about 0.01 wt % to about 10 wt %. When the weight percentage of the compound having a sulfur-oxygen double bond in the electrolytic solution is from about 0.01 wt % to about 10 wt %, it works cooperatively with the carbonate compound having a silicon-containing functional group, to form an intact and effective organic film on the surface of the cathode and anode. As such, the side reactions caused by electron transfer between the non-aqueous electrolytic solution and the electrode are effectively prevented, and the stability of the electrolytic solution is enhanced.

In some embodiments, the weight percentage of the compound having a sulfur-oxygen double bond in the electrolytic solution has an upper limit selected from about 10 wt %, about 5 wt %, about 4 wt %, about 3 wt %, about 2.0 wt %, about 1.5 wt %, and about 1.0 wt %, and a lower limit selected from about 0.01 wt %, about 0.1 wt %, about 0.3 wt %, about 0.5 wt %, and about 0.6 wt %. In some additional embodiments, the weight percentage of the compound having a sulfur-oxygen double bond in the electrolytic solution is about 0.1 wt % to about 5 wt %.

Cyclic Carbonate Compound

In some embodiments, the electrolytic solution of the present application may further comprise a cyclic carbonate compound, to facilitate the enhancement of the stability of the SEI film. The cyclic carbonate compound may be a compound of Formula (IV-A):

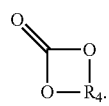

Formula (IV-A)

In Formula (IV-4), $R_1$ is selected from a substituted or unsubstituted $C_2$-$C_6$ alkylene group or a substituted or unsubstituted $C_2$-$C_6$ alkenyl group, wherein when substituted, the substituent is at least one selected from halogen, $C_1$-$C_6$ alkyl, and $C_2$-$C_6$ alkenyl.

In some embodiments, $R_4$ is selected from a substituted or unsubstituted $C_{1-4}$ alkylene group or a substituted or unsubstituted $C_{2-4}$ alkenyl group, wherein when substituted, the substituent is at least one selected from halogen, $C_{1-3}$ alkyl, and $C_{2-4}$ alkenyl.

In some embodiments, the cyclic carbonate compound may be at least one selected from:

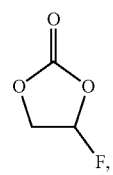

Formula (IV-1)

Formula (IV-2)

Formula (IV-3)

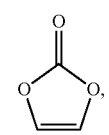

Formula (IV-4)

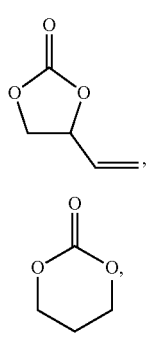

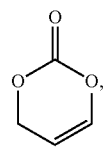

Formula (IV-5)

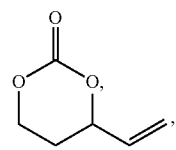

Formula (IV-6)

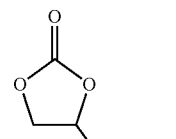

Formula (IV-7)

or

Formula (IV-8)

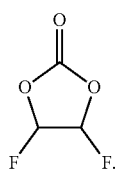

In some embodiments, the weight percentage of the cyclic carbonate compound in the electrolytic solution is from about 0.01 wt % to about 30 wt %. In some embodiments, the weight percentage of the cyclic carbonate compound in the electrolytic solution may be about 0.01 wt % to about 0.1 wt %, about 0.1 wt % to about 1 wt %, about 0.1 wt % to about 2 wt %, about 0.1 wt % to about 3 wt %, about 0.1 wt % to about 4 wt %, about 0.1 wt % to about 5 wt %, about 1 wt % to about 5 wt %, about 1 wt % to about 10 wt %, about 1 wt % to about 20 wt %, about 1 wt % to about 30 wt %, about 5 wt % to about 10 wt %, about 10 wt % to about 30 wt %, and the like.

The cyclic carbonate compound can increase the flexibility of the SEI film, further increase the protection of the active material, and reduce the probability of contact of the active material with the electrolytic solution at the interface, thereby alleviating the impedance increase caused by the accumulation of by-products during the cycle.

Aromatic Compound

In some embodiments, the electrolytic solution of the present application may further comprise an aromatic compound, which may be a compound of Formula (V-A):

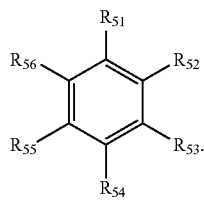

Formula (V-A)

In Formula (V-A), $R_{51}$, $R_{52}$, $R_{53}$, $R_{54}$, $R_{55}$ and $R_{56}$ are each independently selected from hydrogen, fluorine, a substituted or unsubstituted $C_1$-$C_{10}$ alkyl group, a substituted or unsubstituted cycloalkyl group, a substituted or unsubstituted $C_3$-$C_{10}$ cycloalkenyl group, a substituted or unsubstituted $C_2$-$C_{10}$ alkenyl group, a substituted or unsubstituted $C_6$-$C_{10}$ aryl group or a substituted or unsubstituted $C_3$-$C_6$ heterocyclic group, wherein the heteroatom in the heterocyclic group is selected from O, S, and P, and when substituted, the substituent is at least one of halogen, cyano, carboxyl, and a sulfate group.

In some embodiments, the aromatic compound is at least one selected from 2-methylbiphenyl, 2-ethylbiphenyl, terphenyl, partially hydrogenated terphenyl, cyclopentyl benzene, tert-butylbenzene, cis-1-propyl phenylcyclohexane, trans-1-propyl-4-phenylcyclohexane, cis-1-butyl phenylcyclohexane, trans-1-butyl-4-phenylcyclohexane, diphenyl ether, dibenzofuran, fluorobenzene, toluene, 2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexylfluorobenzene, p-cyclohexylfluorobenzene, 2,4-difluoroanisole, 2,5-difluoroanisole, 2,6-difluoroanisole, and 3,5-difluoroanisole.

In some embodiments, the aromatic compound may also be p-fluorotoluene (PFT) or 2,4-difluorobiphenyl (DFBP).

In some embodiments, the weight percentage of the aromatic compound in the electrolytic solution is from about 1 wt % to about 20 wt %. In some embodiments, the weight percentage of the aromatic compound in the electrolytic solution is about 1 wt % to about 5 wt %, about 1 wt % to about 10 wt %, about 5 wt % to about 10 wt %, about 5 wt % to about 15 wt %, about 5 wt % to about 20 wt %, and the like.

Nitrile Compound

In some embodiments, the electrolytic solution of the present application may further comprise a nitrile compound, which includes a compound of Formula (VI-A), a compound of Formula (VI-B), or any combination thereof:

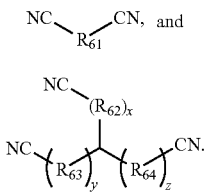

Formula (VI-A)

Formula (VI-B)

In Formula (VI-A), $R_{61}$ is selected from a substituted or unsubstituted $C_1$-$C_{10}$ alkylene group, a substituted or unsubstituted $C_1$-$C_{10}$ alkyleneoxy, a substituted or unsubstituted $C_2$-$C_{10}$ alkenyl group, a substituted or unsubstituted $C_6$-$C_{10}$ arylene group or a substituted or unsubstituted $C_6$-$C_{10}$ cycloalkyl group, wherein when substituted, the substituent is at least one of halogen, $C_1$-$C_6$ alkyl, $C_2$-$C_6$ alkenyl, and cyano.

In Formula (VI-B), $R_{62}$, $R_{63}$, and $R_{64}$ are each independently selected from a substituted or unsubstituted $C_1$-$C_{10}$ alkylene group, a substituted or unsubstituted $C_1$-$C_{10}$ alkyleneoxy, a substituted or unsubstituted $C_2$-$C_{10}$ alkenyl group, a substituted or unsubstituted $C_6$-$C_{10}$ arylene group, a substituted or unsubstituted $C_6$-$C_{10}$ cycloalkyl group or a substituted or unsubstituted $C_3$-$C_6$ heterocyclic group, wherein the heteroatom in the heterocyclic group is selected from O, S, and P; x, y, and z are each independently selected from 0 or 1, wherein when substituted, the substituent is at least one of halogen, $C_1$-$C_6$ alkyl, $C_2$-$C_6$ alkenyl, and cyano.

In some embodiments, the nitrile compound may be a compound of Formula (VI-A) or a compound of Formula (VI-B).

In some embodiments, the nitrile compound may be at least one of

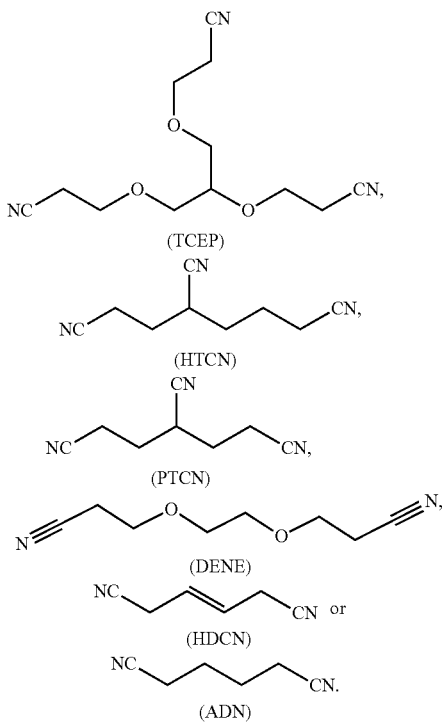

In some embodiments, the nitrile compound is at least one selected from methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,9-bis(2-cyanoethyl)-2,4,8,10-tetraoxaspiro[5,5]undecane, 1,2,3-propane tricarbonitrile, 1,3,5-pentane tricarbonitrile, 1,3,6-hexane tricarbonitrile, 1,2,3-tris(2-cyanoethoxy)propane, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene.

In some embodiments, the weight percentage of the nitrile compound in the electrolytic solution is from about 0.01 wt % to about 20 wt %. In some embodiments, the weight percentage of the nitrile compound in the electrolytic solution may be about 0.1 wt % to about 10 wt %, about 0.1 wt % to about 5 wt %, about 0.1 wt % to about 20 wt %, about 1 wt % to about 5 wt %, about 1 wt % to about 10 wt %, about 5 wt % to about 10 wt %, about 5 wt % to about 20 wt %, and the like.

The nitrile compound works cooperatively with the carbonate compound having a silicon-containing functional group, to further form a good nitrile protection film on the surface of the cathode active material, and well stabilize the cathode active material.

Phosphate and Phosphite

In some embodiments, the electrolytic solution of the present application may further comprise a phosphate, a phosphite or any combination thereof.

In some embodiments, the phosphate and phosphite are at least one selected from tris(2-tert-pentylphenyl)phosphate, tris(3-tert-pentylphenyl)phosphate, tris(4-tert-pentylphenyl) phosphate, tris(2-cyclohexylphenyl)phosphate, tris(3-cyclohexylphenyl)phosphate, tris(4-cyclohexylphenyl)phosphate, triphenylphosphate, tritolylphosphate, tris(tert-butylphenyl) phosphate, tris(2,2,2-trifluoroethyl)phosphate (TFEP), tris (2-tert-pentylphenyl)phosphite, tris(3-tert-pentylphenyl) phosphite, tris(4-tert-pentylphenyl)phosphite, tris((2-cyclohexylphenyl)phosphite, tris(3-cyclohexylphenyephosphite, tris(4-cyclohexylphenyl) phosphite, triphenylphosphite, tritolylphosphite, tris(tert-butylphenyl)phosphite, tris(2,2,2-trifluoroethyl)phosphite, and others.

In some embodiments, the weight percentage of the phosphate and phosphite in the electrolytic solution is from about 0.01 wt % to about 20 wt %. In some embodiments, the weight percentage of the phosphate and phosphite in the electrolytic solution is about 1 wt % to about 10 wt %, about 1 wt % to about 5 wt %, about 5 wt % to about 10 wt %, about 0.1 wt % to about 10 wt %, about 0.1 wt % to about 5 wt %, and the like.

Ether Compound

In some embodiments, the electrolytic solution of the present application may further comprise an ether compound, for example, a cyclic ether or a chain ether. In some embodiments, the weight percentage of the ether compound in the electrolytic solution is from 0.1 wt % to about 20 wt %.

In some embodiments, the content weight percentage of the cyclic ether in the electrolytic solution may be about 0.1 wt % to about 15 wt %, about 0.1 wt % to about 10 wt %, about 0.1 wt % to about 5 wt %, about 0.1 wt % to about 1 wt %, about 0.5 wt % to about 1 wt %, about 0.1 wt % to about 2 wt %, about 1 wt % to about 2 wt %, about 1 wt % to about 5 wt %, and the like.

In some embodiments, the weight percentage of the chain ether in the electrolytic solution may be about 0.1 wt % to about 20 wt %. In some embodiments, the weight percentage of the chain ether in the electrolytic solution may be about 0.1 wt % to about 1 wt %, about 0.5 wt % to about 1 wt %, about 0.1 wt % to about 2 wt %, about 1 wt % to about 2 wt %, about 1 wt % to about 3 wt %, about 2 wt % to about 5 wt %, about 5 wt % to about 10 wt %, and the like.

In some embodiments, the chain ether may include, but is not limited to, at least one of dimethoxymethane, 1,1-dimethoxyethane, 1,2-dimethoxyethane, diethoxymethane, 1,1-diethoxyethane, 1,2-di ethoxyethane, ethoxymethoxymethane, 1,1-ethoxymethoxyethane and 1,2-ethoxymethoxyethane.

2. Organic Solvent

The organic solvent used in the electrolytic solution according to the present application may be any organic solvent known in the art as a solvent for an electrolytic solution.

In some embodiments, the electrolytic solution may comprise a phosphorus-containing organic solvent. The phosphorus-containing organic solvent includes, but is not limited to, at least one of trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate and tris(2,2,3,3,3-pentafluoropropyl) phosphate.

In some embodiments, the weight percentage of the phosphorus-containing organic solvent in the electrolytic solution may be from about 0.1 wt % to about 5 wt %. In some embodiments, the weight percentage of the phosphorus-containing organic solvent in the electrolytic solution may be about 0.1 wt % to about 0.5 wt %, about 0.1 wt % to about 2 wt %, about 0.1 wt % to about 3 wt %, about 0.1 wt % to about 0.5 wt %, about 0.5 wt % to about 2 wt %, about 0.5 wt % to about 3 wt %, about 1 wt % to about 2 wt %, about 1 wt % to about 3 wt %, about 1 wt % to about 5 wt %, and the like.

3. Electrolyte

The electrolyte used in the electrolytic solution according to the present application is not limited, and may be any electrolyte known in the art.

In some embodiments, the electrolyte may comprise a lithium salt. The lithium salt may include at least one of an organic lithium salt and an inorganic lithium salt. In some embodiments, the lithium salt may contain at least one of a fluorine element, a boron element, and a phosphorus element. In some embodiments, the lithium salt is at least one selected from lithium hexafluorophosphate (LiPF$_6$), lithium bis(trifluoromethanesulphonyl)imide (LiN(CF$_3$SO$_2$)$_2$, abbreviated as LiTFSI), lithium bis(fluorosulfonyl)imide (Li(N(SO$_2$F)$_2$, abbreviated as LiFSI), lithium bis(oxalato) borate (LiB(C$_2$O$_4$)$_2$, abbreviated as LiBOB), and lithium difluoro(oxalato)borate (LiBF$_2$(C$_2$O$_4$), abbreviated as LiDFOB).

II. ELECTROCHEMICAL DEVICE

The present application further relates to an electrochemical device. The electrochemical device of the present application includes any device in which an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application includes a cathode having a cathode active material capable of absorbing and releasing metal ions; an anode having an anode active material capable of absorbing and releasing metal ions; and an electrolytic solution of the present application.

In some embodiments, the electrochemical device of the present application comprises a cathode, an anode, a separator disposed between the cathode and the anode, and an electrolytic solution according to any of the preceding embodiments.

1. Cathode

In some embodiments, the cathode of the present application includes a cathode current collector and a cathode active material layer disposed on the cathode current collector. The cathode active material layer may comprise a binder, and optionally a conductive material.

In some embodiments, the cathode active material may comprise a compound that reversibly intercalates and deintercalates lithium ions.

In some embodiments, the cathode active material may comprise a composite oxide which contains lithium and at least one element selected from cobalt, manganese, and nickel. The type of the cathode active material is not particularly limited and can be determined as desired. In some embodiments, the cathode active material may be at least one selected from lithium cobaltate ($LiCoO_2$(LCO)), lithium nickel manganese cobalt ternary material (NCM), lithium iron phosphate, and lithium manganate.

In some embodiments, the cathode active material may have a coating on its surface or may be mixed with another compound having a coating. The coating may include at least one coating element compound selected from an oxide of a coating element, a hydroxide of a coating element, an oxyhydroxide of a coating element, an oxycarbonate of a coating element, and a hydroxycarbonate of a coating element. The compound used for the coating may be amorphous or crystalline. In some embodiments, the coating element contained in the coating may include Mg, Al, Co, K, Na, Ca, Si, Ti, V, Sn, Ge, Ga, B, As, Zr or a mixture thereof. The coating can be applied by any method as long as the method does not adversely affect the performance of the cathode active material. For example, the method may include any coating method known to those skilled in the art, such as spraying, dipping, and others.

In some embodiments, the binder can increase the binding of the cathode active material particles to each other and the binding of the cathode active material to the current collector. In some embodiments, the binder includes at least one of polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, and Nylon.

In some embodiments, the conductive material can impart conductivity to the electrode and may include any conductive material as long as it does not cause a chemical change. In some embodiments, the conductive material may include at least one of a carbon-based material (e.g., natural graphite, artificial graphite, carbon black, acetylene black, ketjen black, and carbon fiber, etc.), a metal-based material (e.g., a metal powder, and a metal fiber, etc., including for example copper, nickel, aluminum, silver, and so on), a conductive polymer (for example, a polyphenylene derivative) and a mixture thereof.

In some embodiments, the cathode current collector may be, but is not limited to, aluminum (Al).

2. Anode

In some embodiments, the anode includes an anode current collector and an anode active material layer disposed on the anode current collector. The anode active material layer may comprise a binder, and optionally include a conductive material.

In some embodiments, the anode active material may be one or more selected from natural graphite, artificial graphite, mesocarbon microbead (MCMB), hard carbon, soft carbon, silicon, silicon-carbon composite, Li—Sn alloy, Li—Sn—O alloy, Sn, SnO, $SnO_2$, lithiated $TiO_2$—$Li_4Ti_5O_{12}$ having spinel structure, and Li—Al alloy. In some embodiments, the anode active material may be graphite, silicon or a blend thereof.

In some embodiments, the anode active material may be a carbon material, including crystalline carbon, amorphous carbon, and a mixture thereof. The crystalline carbon may be formless or plate-shaped, platelet-shaped, spherical or fibrous natural graphite or artificial graphite. The amorphous carbon may be soft carbon, hard carbon, carbonized mesophase pitch, calcined coke, and the like.

In some embodiments, the binder can increase the binding of the anode active material particles to each other and the binding of the anode active material to the current collector. In some embodiments, the binder may include at least one of polyvinyl alcohol, carboxymethylcellulose, hydroxypropyl cellulose, di acetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, and Nylon.

In some embodiments, the conductive material can impart conductivity to the electrode and may include any conductive material as long as it does not cause a chemical change. In some embodiments, the conductive material may include at least one of a carbon-based material (e.g., natural graphite, artificial graphite, carbon black, acetylene black, ketjen black, and carbon fiber, etc.), a metal-based material (e.g., a metal powder, and a metal fiber, etc., for example copper, nickel, aluminum, silver, and so on), a conductive polymer (for example, a polyphenylene derivative) and a mixture thereof.

In some embodiments, the anode current collector may include at least one of copper foil, nickel foil, stainless steel foil, titanium foil, foamed nickel, foamed copper, polymeric substrates coated with a conductive metal, and a combination thereof.

3. Separator

In some embodiments, the separator of the present application can prevent short circuits. The material and shape of the separator are not particularly limited, and may be any of the techniques disclosed in the prior art. In some embodiments, the separator may include a polymer or an inorganic substance or the like formed of a material which is stable against the electrolytic solution of the present application.

In some embodiments, the separator may include a substrate layer and a surface treatment layer.

In some embodiments, the substrate layer is a nonwoven fabric, a film or a composite film having a porous structure. In some embodiments, the material of the substrate layer is at least one selected from polyethylene, polypropylene, polyethylene terephthalate, and polyimide. Particularly, the material of the substrate layer may be a porous polypropylene film, a porous polyethylene film, a polypropylene nonwoven fabric, a polyethylene nonwoven fabric, and a porous polypropylene-polyethylene-polypropylene composite film.

In some embodiments, at least one surface of the substrate layer is provided with a surface treatment layer, which may be a polymer layer or an inorganic layer, or a layer formed by mixing a polymer and an inorganic material.

In some embodiments, the inorganic layer may include inorganic particles and a binder. In some embodiments, the inorganic particles may be selected from one of alumina, silica, magnesia, titania, hafnium dioxide, tin oxide, cerium dioxide, nickel oxide, zinc oxide, calcium oxide, zirconia, yttria, silicon carbide, boehmite, aluminum hydroxide, magnesium hydroxide, calcium hydroxide and barium sulfate, or a combination of more than one thereof. In some embodiments, the binder may be one or more selected from polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene.

In some embodiments, the polymer layer may comprise a polymer. In some embodiments, the polymer is at least one selected from a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

III. EXAMPLES

The performance evaluation of the lithium ion batteries in the examples and comparative examples of the present application is described below.

1. Preparation of Lithium-Ion Batteries (1) Preparation of an Electrolytic Solution In an argon atmosphere glovebox with a moisture content of <10 ppm, ethylene carbonate (EC), diethyl carbonate (DEC), and propylene carbonate (PC) were mixed uniformly at a weight ratio of 3:4:3. Then a fully dried lithium salt $LiPF_6$ was dissolved in the above non-aqueous solvent, to obtain a basic electrolytic solution in which the concentration of $LiPF_6$ was about 1 mol/L. Different amounts of materials shown in Tables below were added to the basic electrolytic solution to obtain the electrolytic solutions of various examples and comparative examples. The contents of each substance in the electrolytic solution described below were calculated based on the total weight of the electrolytic solution.

In the electrolytic solution, the additives were configured according to the following examples and comparative examples.

(2) Preparation of a Cathode

NCM (molecular formula $LiNi_{0.8}Co_{0.1}Mn_{0.1}O_2$) as the cathode active material, acetylene black as the conductive agent, and polyvinylidene fluoride (PVDF) as the binder were mixed fully at a weight ratio of 96:2:2 by stirring in a suitable amount of N-methylpyrrolidone (NMP) as a solvent, to form a uniform cathode slurry. The slurry was applied to an Al foil as a cathode current collector, dried, and cold pressed to obtain a cathode.

(3) Preparation of an anodeGraphite as the anode active material, acetylene black as the conductive agent, styrene-butadiene rubber (SBR) as the binder, and carboxymethylcellulose sodium (CMC) as the thickener were mixed fully at a weight ratio of 95:2:2:1 by stirring in a suitable amount of deionized water as a solvent, to form a uniform anode slurry. The slurry was applied to a Cu foil as an anode current collector, dried, and cold pressed to obtain an anode.

(4) Separator

A porous PE polymer film was used as a separator.

(5) Preparation of a Lithium-Ion Battery

The obtained cathode, separator and anode were wound in such an order that the separator was placed between the cathode and the anode to serve for isolating, and placed in the outer packaging foil to leave a liquid filling port. A lithium ion battery was fabricated by injecting the electrolytic solution via the liquid injection port, encapsulating, then forming, and capacity grading.

The electrolytic solutions and lithium ion batteries of various examples and comparative examples were prepared as described above, and the lithium ion batteries were subjected to the following tests.

2. Test Method (1) Overcharge Test 10 batteries were discharged at 0.5 C to 2.8 V at 25° C., charged to 5 V at a constant current of 2 C, and then charged for 3 h at a constant voltage. Where no fire and/or explosion occurred, the battery passed the test, and the number of batteries passing the test was recorded.

(2) Storage Test at 85° C.

The batteries were charged to 4.2 V at a constant current of 2 C at room temperature, and then charged to a current of 0.05 C at a constant voltage. The thickness of the lithium ion batteries was tested and record as $d_0$. The batteries were placed in an oven at 85° C. for 6 h, and the thickness at this time was monitored and recorded as d. Thickness expansion rate (%) of the lithium ion battery after 6 h of high-temperature storage=$(d-d_0)/d_0 \times 100\%$.

(3) Cycle Test at 25° C.

The batteries were charged at 2 C to 4.2 V at 25° C., and then charged to 0.05 C at a constant voltage of 4.2 V. Thereafter, the batteries were discharged to 2.8 V at a current of 6 C, and the discharge capacity was recorded, which is the discharge capacity of the first cycle. 600 cycles were performed following the process of charging at 2 C and discharging at 6 C, the discharge capacity was recorded, and the capacity retention rate was calculated. The capacity retention rate after the cycles was calculated according to a formula below: Capacity retention rate after the cycles= (Discharge capacity of a corresponding cycle/Discharge capacity of the first cycle)×100%.

(4) Floatation Test

The batteries were discharged to 2.8 V at 0.5 C at 25° C., charged to 4.2 V at 0.5 C and then to 0.05 C at a constant voltage of 4.2 V, placed in an oven at 45° C., maintained at 4.2 V for 50 days, and monitored for the thickness change. The initial thickness at 50% State of Charge (SOC) was used as a reference. The thickness expansion rate of the battery was calculated.

3. Test Results

As shown in Table 1, the electrolytic solutions of Examples 1-18 are electrolytic solutions containing a carbonate compound having a silicon-containing functional group in the basic electrolytic solution, and the electrolytic solution of the comparative example is the basic electrolytic solution. Overcharge tests and high-temperature storage tests were performed on the lithium ion batteries of Examples 1-18 and the comparative example.

TABLE 1

Electrolytic solutions and test results of Examples 1-18 and the comparative example

| Example | Carbonate compound having a silicon-containing functional group | | Overcharge test | Storage at 85° C. |
| --- | --- | --- | --- | --- |
| | Structural formula | Content (wt %) | (10 batteries) | |
| Example 1 | I-2 | 0.1 | 1 | 25.5% |
| Example 2 | I-2 | 0.5 | 1 | 24.6% |
| Example 3 | I-2 | 1 | 1 | 22.0% |
| Example 4 | I-2 | 2 | 1 | 20.0% |
| Example 5 | I-2 | 3 | 2 | 18.0% |
| Example 6 | I-2 | 5 | 5 | 12.0% |

TABLE 1-continued

Electrolytic solutions and test results of Examples 1-18 and the comparative example

| Example | Carbonate compound having a silicon-containing functional group Structural formula | Content (wt %) | Overcharge test (10 batteries) | Storage at 85° C. |
|---|---|---|---|---|
| Example 7 | I-2 | 8 | 7 | 9.9% |
| Example 8 | I-2 | 10 | 10 | 8.9% |
| Example 9 | I-2 | 15 | 10 | 9.5% |
| Example 10 | I-2 | 20 | 7 | 10.7% |
| Example 11 | I-2 | 30 | 3 | 15.6% |
| Example 12 | I-5 | 10 | 10 | 9.6% |
| Example 13 | I-9 | 10 | 7 | 9.5% |
| Example 14 | II-1 | 10 | 10 | 11.5% |
| Example 15 | II-2 | 10 | 10 | 13.0% |
| Example 16 | II-5 | 10 | 5 | 10.5% |
| Example 17 | I-2 + II-2 | 5 + 3 | 10 | 9.2% |
| Example 18 | I-5 + II-2 | 5 + 3 | 10 | 11.0% |
| Comparative Example | — | — | 0 | 30% |

It can be seen from Table 1 that in Examples 1-18, a carbonate compound having a silicon-containing functional group is added, and the number of batteries passing the overcharge test and the expansion rate upon storage at 85° C. improved notably.

More specifically, when the content of the compound having a silicon-containing functional group is over 0.1% by weight, the overcharge performance of the battery and the storage performance at 85° C. are improved, and the improvement is more remarkable when the content is more than 1 wt %. This may be because the carbonate compound having a silicon-containing functional group can form a stable protection film on the electrode surface, thereby alleviating the heat generation resulting from decomposition of the electrolytic solution on the electrode surface during the overcharge of the lithium ion battery. Therefore, it can be confirmed that the batteries manufactured in Examples 1-18 have better overcharge performance and storage performance at 85° C.

As shown in Table 2, the electrolytic solutions of Examples 19-31 are electrolytic solutions containing a carbonate compound having a silicon-containing functional group and a compound having a sulfur-oxygen double bond in a basic electrolytic solution. Examples 8 and 12 are used as comparative examples. Overcharge tests and storage tests at 85° C. were performed on the lithium ion batteries of Examples 8, 12, and 19-31.

TABLE 2

Electrolytic solutions and test results of Examples 8, 12, and 19-31

| Example | Carbonate compound having a silicon-containing functional group Structural formula | Content (wt %) | Compound having a sulfur-oxygen double bond Structural formula | Content (wt %) | Overcharge test (10 batteries) | Storage at 85° C. |
|---|---|---|---|---|---|---|
| Example 8 | I-2 | 10 | — | — | 10 | 8.9% |
| Example 19 | I-2 | 10 | III-9 | 0.1 | 10 | 8.7% |
| Example 20 | I-2 | 10 | III-9 | 0.5 | 10 | 8.2% |
| Example 21 | I-2 | 10 | III-9 | 1 | 10 | 7.8% |
| Example 22 | I-2 | 10 | III-9 | 3 | 10 | 7.2% |
| Example 23 | I-2 | 10 | III-9 | 4 | 10 | 7.8% |
| Example 24 | I-2 | 10 | III-9 | 5 | 10 | 8.1% |
| Example 25 | I-2 | 10 | III-11 | 2 | 10 | 6.5% |
| Example 26 | I-2 | 10 | III-11 | 3 | 10 | 7.8% |
| Example 27 | I-2 | 10 | III-13 | 2 | 10 | 7.6% |
| Example 28 | I-2 | 10 | III-12 | 0.1 | 10 | 8.2% |
| Example 29 | I-2 | 10 | III-12 | 1 | 10 | 6.9% |
| Example 30 | I-2 | 10 | III-13 | 1 | 10 | 6.7% |
| Example 12 | I-5 | 10 | — | — | 10 | 9.6% |
| Example 31 | I-5 | 10 | III-12 | 1 | 10 | 6.0% |

As shown in Table 2, it can be found through comparison of Examples 19-31 and Examples 8 and 12 that the addition of a compound having a sulfur-oxygen double bond can further improve the high-temperature storage performance of the batteries while the overcharge performance is guaranteed. This may be because the combination of the carbonate compound having a silicon-containing functional group and the compound having a sulfur-oxygen double bond can form an intact and effective organic film on the surface of the cathode and anode electrodes. As such, the side reactions caused by electron transfer between the non-aqueous electrolytic solution and the electrode are effectively prevented.

As shown in Table 3, the electrolytic solutions of Examples 32-49 are electrolytic solutions containing a carbonate compound having a silicon-containing functional group and an aromatic compound (for example, fluorobenzene) in the basic electrolytic solution. Overcharge test and cycle test at 25° C. were performed on the lithium ion batteries of Examples 8, and 32-50.

TABLE 3

Electrolytic solutions and test results of Examples 8, and 32-50

| Example | Carbonate compound having a silicon-containing functional group Structural formula | Content (wt %) | Fluorobenzene Structural formula | Content (wt %) | Overcharge test (10 batteries) | Cycle at 25° C. |
|---|---|---|---|---|---|---|
| Comparative Example | — | — | — | — | 0 | 73.1% |
| Example 8 | I-2 | 10 | — | — | 10 | 84.5% |
| Example 32 | I-2 | 10 | PFT | 0.1 | 10 | 84.6% |
| Example 33 | I-2 | 10 | PFT | 0.5 | 10 | 85.7% |
| Example 34 | I-2 | 10 | PFT | 1 | 10 | 86.9% |
| Example 35 | I-2 | 10 | PFT | 2 | 10 | 87.6% |
| Example 36 | I-2 | 10 | PFT | 3 | 10 | 87.0% |
| Example 37 | I-2 | 8 | PFT | 2 | 10 | 87.2% |
| Example 38 | I-5 | 10 | PFT | 2 | 10 | 86.9% |
| Example 39 | I-9 | 10 | PFT | 2 | 10 | 87.1% |
| Example 40 | I-2 | 10 | DFBP | 0.1 | 10 | 84.3% |
| Example 41 | I-2 | 10 | DFBP | 0.5 | 10 | 86.1% |
| Example 42 | I-2 | 10 | DFBP | 1 | 10 | 86.9% |
| Example 43 | I-2 | 10 | DFBP | 2 | 10 | 87.6% |
| Example 44 | I-2 | 10 | DFBP | 3 | 10 | 88.5% |

TABLE 3-continued

Electrolytic solutions and test results of Examples 8, and 32-50

| Example | Carbonate compound having a silicon-containing functional group Structural formula | Content (wt %) | Fluorobenzene Structural formula | Content (wt %) | Overcharge test (10 batteries) | Cycle at 25° C. |
|---|---|---|---|---|---|---|
| Example 45 | I-2 | 10 | DFBP | 5 | 10 | 88.1% |
| Example 46 | I-2 | 8 | DFBP | 3 | 10 | 88.0% |
| Example 47 | I-2 | 5 | DFBP | 3 | 10 | 87.3% |
| Example 48 | I-2 | 15 | DFBP | 3 | 10 | 87.1% |
| Example 49 | I-9 | 10 | DFBP | 3 | 10 | 88.7% |
| Example 50 | I-9 | 8 | DFBP | 3 | 10 | 88.5% |

As shown in Table 3, it can be seen through comparison of Examples 32-36 and 40-45 with Example 8 that after adding a certain amount of an aromatic compound, the battery can not only maintain a good overcharge performance, but also have an improved capacity retention rate after cycle. This may be because the combination of the carbonate compound having a silicon-containing functional group with the aromatic compound can form a stable interface film during the cycle, thereby improving the cycle performance.

As shown in Table 4, the electrolytic solutions of Examples 51-67 are electrolytic solutions containing a carbonate compound having a silicon-containing functional group and a nitrile compound in the basic electrolytic solution. Overcharge test, storage test at 85° C. and floatation test were performed on the lithium ion batteries of the comparative example, Examples

TABLE 4

Electrolytic solutions and test results of Examples 8, and 50-66

| Example | Carbonate compound having a silicon-containing functional group Structural formula | Content (wt %) | Nitrile compound Structural formula | Content (wt %) | Overcharge test (10 batteries) | Storage at 85° C. | Floatation |
|---|---|---|---|---|---|---|---|
| Comparative Example | — | — | — | — | 0 | 30% | 29.5% |
| Example 8 | I-2 | 10 | — | — | 10 | 8.9% | 12.6% |
| Example 51 | I-2 | 10 | HTCN | 0.1 | 10 | 9.2% | 10.9% |
| Example 52 | I-2 | 10 | HTCN | 0.3 | 10 | 8.2% | 10.1% |
| Example 53 | I-2 | 10 | HTCN | 0.5 | 10 | 7.4% | 9.9% |
| Example 54 | I-2 | 10 | HTCN | 1 | 10 | 6.9% | 9.2% |
| Example 55 | I-2 | 10 | HTCN | 2 | 10 | 5.9% | 8.3% |
| Example 56 | I-2 | 10 | HTCN | 3 | 10 | 6.5% | 8.9% |
| Example 57 | I-2 | 10 | DENE + HDCN | 2 + 2 | 10 | 6.9% | 8.5% |
| Example 58 | I-2 | 10 | DENE + PTCN | 2 + 2 | 10 | 6.0% | 7.8% |
| Example 59 | I-2 | 10 | HDCN + HTCN | 2 + 2 | 10 | 6.1% | 7.9% |
| Example 60 | I-2 | 10 | HDCN + PTCN | 2 + 2 | 10 | 6.5% | 8.0% |
| Example 61 | I-2 | 10 | ADN + HDCN | 2 + 2 | 10 | 7.9% | 8.7% |
| Example 62 | I-2 | 10 | ADN + TCEP | 2 + 2 | 10 | 6.3% | 8.3% |
| Example 63 | I-2 | 10 | TCEP | 2 | 10 | 6.5% | 8.5% |
| Example 64 | I-2 | 10 | PTCN | 2 | 10 | 6.9% | 8.6% |
| Example 65 | I-2 | 10 | DENE | 2 | 10 | 7.2% | 8.9% |
| Example 66 | I-2 | 10 | HDCN | 2 | 10 | 8.5% | 9.2% |
| Example 67 | I-2 | 10 | ADN | 2 | 10 | 8.6% | 9.3% |

As shown in Table 4, it can be seen through comparison of Examples 51-67 and Example 8 that after adding a nitrile compound, the high-temperature storage performance of the batteries can be further improved and the floatation performance is ameliorated while the overcharge performance is guaranteed. This may be because the combination of the carbonate compound having a silicon-containing functional group and the nitrile compound can form a stable SEI film on the surface of the cathode and anode electrodes, thereby enhancing the stability of the battery.

As shown in Table 5, the electrolytic solutions of Examples 68-78 is electrolytic solutions containing a carbonate compound having a silicon-containing functional group, a compound having a sulfur-oxygen double bond, an aromatic compound (for example, fluorobenzene), and a nitrile compound in the basic electrolytic solution. Overcharge test, high-temperature storage test and cycle test at 25° C. were performed on the lithium ion batteries of Examples 8 and 68-78.

TABLE 5

Electrolytic solutions and test results of Examples 8, and 68-78

| Example | Carbonate compound having a silicon-containing functional group | | Compound having a sulfur-oxygen double bond | | Fluorobenzene | | Nitrile compound | | Over-charge test (10 batteries) | Storage at 85° C. | Cycle at 25° C. |
|---|---|---|---|---|---|---|---|---|---|---|---|
| | Structural formula | Content (wt %) | Structural formula | Content (wt %) | Structural formula | Content (wt %) | Structural formula | Content (wt %) | | | |
| Example 8 | I-2 | 10 | — | — | — | — | — | — | 10 | 8.9% | 84.5% |
| Example 68 | I-2 | 10 | III-9 | 3 | PFT | 2 | — | — | 10 | 8.8% | 87.3% |
| Example 69 | I-2 | 10 | III-9 | 3 | DFBP | 3 | — | — | 10 | 8.4% | 88.7% |
| Example 70 | I-2 | 10 | III-11 | 3 | PFT | 2 | — | — | 10 | 7.4% | 88.2% |
| Example 71 | I-2 | 10 | III-11 | 3 | — | — | HTCN | 2 | 10 | 4.1% | 86.5% |
| Example 72 | I-2 | 10 | — | — | PFT | 2 | HTCN | 2 | 10 | 6.7% | 89.5% |
| Example 73 | I-2 | 10 | III-11 | 3 | — | — | DENE + HTCN | 2 + 2 | 10 | 4.3% | 87.0% |
| Example 74 | I-2 | 10 | — | — | PFT | 2 | TCEP | 2 | 10 | 7.6% | 88.1% |
| Example 75 | I-2 | 10 | — | — | PFT | 2 | PTCN | 2 | 10 | 7.7% | 88.5% |
| Example 76 | I-2 | 10 | III-9 | 3 | — | — | HTCN | 2 | 10 | 5.1% | 86.3% |
| Example 77 | I-2 | 10 | III-9 | 3 | PFT + DFBP | 1 + 1 | HTCN | 2 | 10 | 8.5% | 89.2% |
| Example 78 | I-2 | 10 | III-9 | 3 | PFT + DFBP | 2 + 2 | HTCN | 2 | 10 | 9.9% | 91.6% |

When the electrolytic solution comprises a combination of a carbonate compound having a silicon-containing functional group with at least two of a compound having a sulfur-oxygen double bond, an aromatic compound (for example, fluorobenzene), and a nitrile compound, both the cycle performance and the high-temperature storage performance can be improved.

References throughout the specification to "embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present application, and modifications, substitutions and changes can be made to the embodiments without departing from the spirit and scope of the present application.

What is claimed is:

1. An electrolytic solution, comprising a carbonate compound having a silicon-containing functional group, wherein the carbonate compound having a silicon-containing functional group comprises at least one compound selected from the group consisting of a compound of Formula (II-A) and a compound of Formula (II-C):

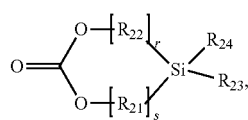

Formula (II-A)

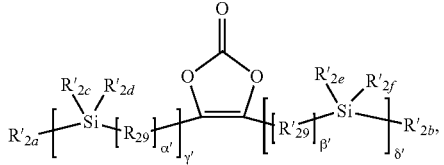

Formula (II-C)

wherein $R_{21}$, $R_{22}$, $R_{29}$, and $R'_{29}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein r, s, $\alpha'$, and $\beta'$ of are each independently selected from 0 or 1, and r and s are not 0 simultaneously;

wherein $R_{23}$, $R_{24}$, $R'_{2a}$, $R'_{2b}$, $R'_{2c}$, $R'_{2d}$, $R'_{2e}$, and $R'_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein $\gamma'$, and $\delta'$ are each independently selected from an integer from 0 to 3;

wherein number of Si in the compound of Formula (II-C) is 1 to 6;

wherein $R'_{2c}$, $R'_{2d}$ and $R'_{2a}$ are not hydrogen simultaneously; and $R'_{2e}$, $R'_{2f}$ and $R'_{2b}$ are not hydrogen simultaneously.

2. The electrolytic solution according to claim 1, wherein the carbonate compound having a silicon-containing functional group further comprises at least one compound selected from the group consisting of a compound of Formula (I-A), and a compound of Formula (II-B):

Formula (I-A)

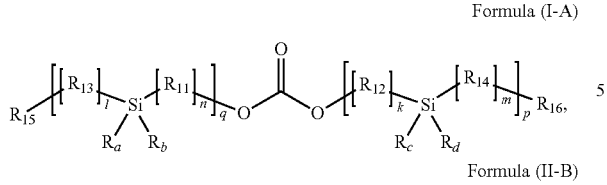

Formula (II-B)

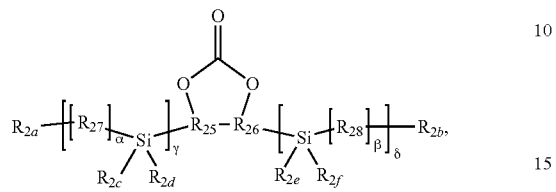

wherein $R_{11}$, $R_{12}$, $R_{13}$, $R_{14}$, $R_{27}$, and $R_{28}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein n, m, l, k, α, β are each independently selected from 0 or 1;

wherein $R_{15}$, $R_{16}$, $R_{2a}$, $R_{2b}$, $R_a$, $R_b$, $R_c$, $R_d$, $R_{2c}$, $R_{2d}$, $R_{2e}$, and $R_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein p, q, γ, δ are each independently selected from an integer from 0 to 3;

wherein each number of Si in the compounds of Formula (I-A), and Formula (II-B) is 1 to 6;

wherein $R_{25}$ and $R_{26}$ are each independently selected from a substituted or unsubstituted $C_1$-$C_6$ alkylidene group or a substituted or unsubstituted $C_2$-$C_6$ alkenyl group, and when substituted, the substituent is at least one selected from halogen, $C_1$-$C_6$ alkyl, and $C_2$-$C_6$ alkenyl;

wherein $R_d$ and $R_{16}$, together with Si to which they are attached, optionally form a ring;

when l is 0, $R_a$, $R_b$ and $R_{15}$ are not hydrogen simultaneously;

when m is 0, $R_c$, $R_d$ and $R_{16}$ are not hydrogen simultaneously;

when α is 0, $R_{2a}$, $R_{2c}$ and $R_{2d}$ are not hydrogen simultaneously; and when β is 0, $R_{2b}$, $R_{2e}$ and $R_{2f}$ are not hydrogen simultaneously.

3. The electrolytic solution according to claim 2, wherein the compound of Formula (I-A), the compound of Formula (II-A), the compound of Formula (II-B) or the compound of Formula (II-C) is at least one selected from:

Formula (I-1)

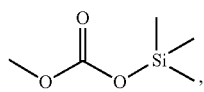

Formula (I-2)

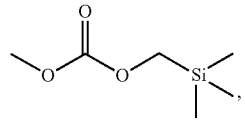

Formula (I-3)

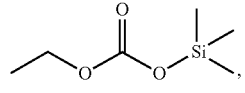

Formula (I-4)

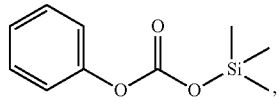

Formula (I-5)

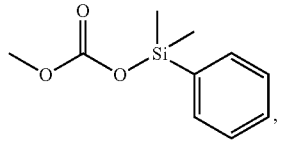

Formula (I-6)

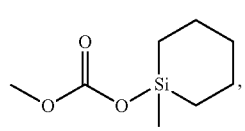

Formula (I-7)

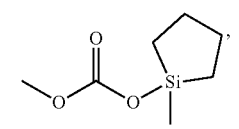

Formula (I-8)

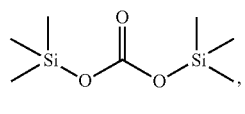

Formula (I-9)

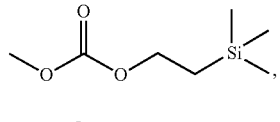

Formula (I-10)

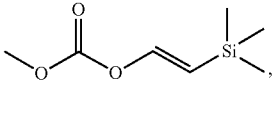

Formula (II-1)

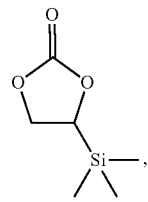

Formula (II-2)

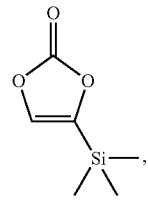

-continued

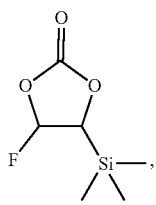
Formula (II-3)

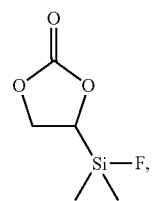
Formula (II-4)

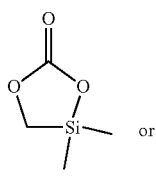
Formula (II-5)

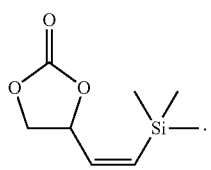
Formula (II-6)

4. The electrolytic solution according to claim 1, wherein the weight percentage of the carbonate compound having a silicon-containing functional group in the electrolytic solution is from about 0.005 wt % to about 70 wt %.

5. The electrolytic solution according to claim 1, further comprising a compound having a sulfur-oxygen double bond, wherein the compound having a sulfur-oxygen double bond includes a compound of Formula (III-A), a compound of Formula (III-B), or any combination thereof:

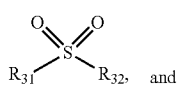
Formula (III-A)

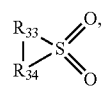
Formula (III-B)

wherein $R_{31}$ and $R_{32}$ are each independently selected from a substituted or unsubstituted $C_1$-$C_5$ alkyl group, a substituted or unsubstituted $C_2$-$C_{10}$ alkenyl group, a substituted or unsubstituted $C_6$-$C_{10}$ aryl group or a substituted or unsubstituted $C_1$-$C_{10}$ alkyl group containing a heteroatom, in which the heteroatom is selected from O, S, and P, and when substituted, the substituent is one or more of halogen, nitro, cyano, carboxyl, and a sulfate group;

wherein $R_{33}$ and $R_{34}$ are each independently selected from a substituted or unsubstituted $C_1$-$C_4$ alkylene group, a substituted or unsubstituted $C_2$-$C_4$ alkenyl group, or a substituted or unsubstituted $C_1$-$C_6$ alkylene group containing a heteroatom, and when substituted, the substituent is at least one selected from halogen, $C_1$-$C_3$ alkyl, and $C_2$-$C_4$ alkenyl, and the heteroatom is selected from O, S, and P; and wherein the weight percentage of the compound having a sulfur-oxygen double bond in the electrolytic solution is from about 0.01 wt % to about 10 wt %.

6. The electrolytic solution according to claim 5, wherein the compound having a sulfur-oxygen double bond is at least one selected from:

Formula (III-1)

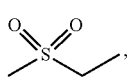
Formula (III-2)

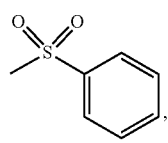
Formula (III-3)

Formula (III-4)

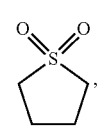
Formula (III-5)

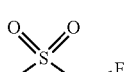
Formula (III-6)

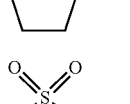
Formula (III-7)

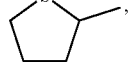
Formula (III-8)

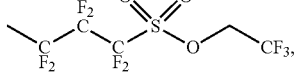
Formula (III-9)

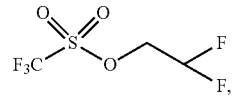
Formula (III-10)

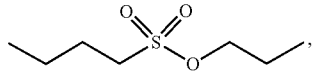
Formula (III-11)

Formula (III-12)

-continued

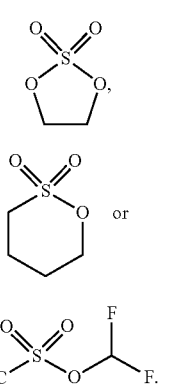

Formula (III-13)

Formula (III-15)

Formula (III-15)

7. The electrolytic solution according to claim 1, further comprising a cyclic carbonate compound, which is a compound of Formula (IV-A):

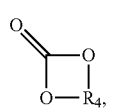

Formula (IV-A)

wherein $R_4$ is selected from a substituted or unsubstituted $C_2$-$C_6$ alkylene group or a substituted or unsubstituted $C_2$-$C_6$ alkenyl group, and wherein the substituent is at least one selected from halogen, $C_1$-$C_6$ alkyl, and $C_2$-$C_6$ alkenyl, and wherein the weight percentage of the cyclic carbonate compound in the electrolytic solution is from about 0.01 wt % to about 30 wt %.

8. The electrolytic solution according to claim 1, further comprising an aromatic compound, which is a compound of Formula (V-A):

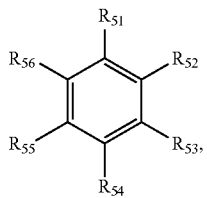

Formula (V-A)

wherein $R_{51}$, $R_{52}$, $R_{53}$, $R_{54}$, $R_{55}$ and $R_{56}$ are each independently selected from hydrogen, fluorine, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_2$-$C_{10}$ alkenyl group, a substituted or unsubstituted $C_6$-$C_{10}$ aryl group or a substituted or unsubstituted $C_3$-$C_6$ heterocyclic group, and the heteroatom in the heterocyclic group is selected from O, S, and P, and when substituted, the substituent is at least one of halogen, cyano, carboxyl, and a sulfate group.

9. The electrolytic solution according to claim 8, wherein the aromatic compound is at least one selected from 2-methylbiphenyl, 2-ethylbiphenyl, terphenyl, partially hydrogenated terphenyl, cyclopentylbenzene, tert-butylbenzene, cis-1-propyl-4-phenylcyclohexane, trans-1-propyl-4-phenylcyclohexane, cis-1-butyl-4-phenylcyclohexane, trans-1-butyl-4-phenylcyclohexane, diphenyl ether, dibenzofuran, fluorobenzene, toluene, 2-fluorotoluene, 3-fluorotoluene, 4-fluorotoluene, 2,4-difluorotoluene, 2-fluorobiphenyl, 3-fluorobiphenyl, 4-fluorobiphenyl, 4,4'-difluorobiphenyl, 2,4-difluorobiphenyl, o-cyclohexylfluorobenzene, p-cyclohexylfluorobenzene, 2,4-difluoroanisole, 2,5-difluoroanisole, 2,6-difluoroanisole, and 3,5-difluoroanisole; and wherein the weight percentage of the aromatic compound in the electrolytic solution is from about 1 wt % to about 20 wt %.

10. The electrolytic solution according to claim 1, further comprising a nitrile compound, wherein the nitrile compound includes a compound of Formula (VI-A), a compound of Formula (VI-B), or any combination thereof:

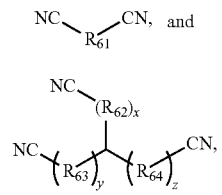

Formula (VI-A)

Formula (VI-B)

wherein $R_{61}$ is at least one selected from a substituted or unsubstituted $C_1$-$C_{10}$ alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group or a substituted or unsubstituted $C_6$-$C_{10}$ cycloalkyl group, and the substituent is at least one of halogen, $C_1$-$C_6$ alkyl, $C_2$-$C_6$ alkenyl, and cyano; and wherein $R_{62}$, $R_{63}$, and $R_{64}$ are each independently selected from a substituted or unsubstituted $C_1$-$C_{10}$ alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group, a substituted or unsubstituted $C_6$-$C_{10}$ cycloalkyl group or a substituted or unsubstituted $C_3$-$C_6$ heterocyclic group, and the heteroatom in the heterocyclic group is selected from O, S, and P; and wherein x, y, and z are each independently selected from 0 or 1, and when substituted, the substituent is at least one of halogen, $C_1$-$C_6$ alkyl, $C_2$-$C_6$ alkenyl, and cyano.

11. The electrolytic solution according to claim 10, wherein the nitrile compound is at least one selected from methylmalononitrile, ethylmalononitrile, isopropylmalononitrile, tert-butylmalononitrile, methylsuccinonitrile, 2,2-dimethyl succinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,9-bis(2-cyanoethyl)-

2,4,8,10-tetraoxaspiro[5,5]undecane, 1,2,3-propane tricarbonitrile, 1,3,5-pentane tricarbonitrile, 1,3,6-hexane tricarbonitrile, 1,2,3-tris(2-cyanoethoxy)propane, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene; and wherein the weight percentage of the nitrile compound in the electrolytic solution is from about 0.01 wt % to about 20 wt %.

12. An electrochemical device, comprising a cathode, an anode, a separator disposed between the cathode and the anode, and an electrolytic solution, wherein the electrolytic solution comprises a carbonate compound having a silicon-containing functional group, wherein the carbonate compound having a silicon-containing functional group comprises at least one compound selected from the group consisting of a compound of Formula (II-A) and a compound of Formula (II-C):

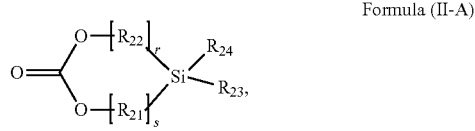

Formula (II-A)

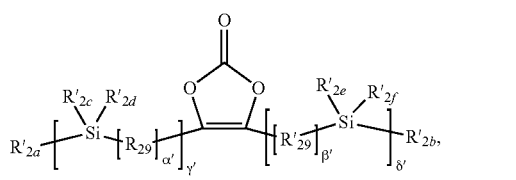

Formula (II-C)

wherein $R_{21}$, $R_{22}$, $R_{29}$, and $R'_{29}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein r, s, α', and β' are each independently selected from 0 or 1, and r and s are not 0 simultaneously;

wherein $R_{23}$, $R_{24}$, $R'_{2a}$, $R'_{2b}$, $R'_{2c}$, $R'_{2d}$, $R'_{2e}$, and $R'_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein γ', and δ' are each independently selected from an integer from 0 to 3;

wherein number of Si in the compound of Formula (II-C) is 1 to 6;

wherein $R'_{2c}$, $R'_{2d}$ and $R'_{2a}$ are not hydrogen simultaneously; and $R'_{2e}$, $R'_{2f}$ and $R'_{2b}$ are not hydrogen simultaneously.

13. The electrochemical device according to claim 12, wherein the carbonate compound having a silicon-containing functional group further comprises at least one compound selected from the group consisting of a compound of Formula (I-A), and a compound of Formula (II-B):

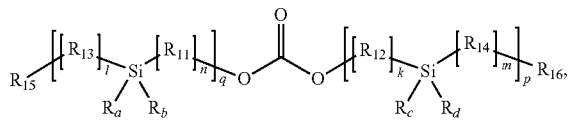

Formula (I-A)

Formula (II-B)

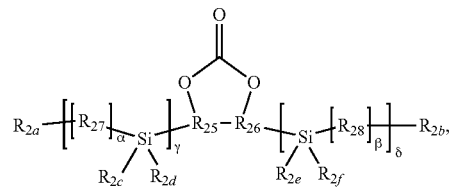

wherein $R_{11}$, $R_{12}$, $R_{13}$, $R_{14}$, $R_{27}$, and $R_{28}$ are each independently selected from a substituted or unsubstituted $C_1$-$C_{10}$ alkylene group, a substituted or unsubstituted $C_2$-$C_{10}$ alkenyl group, a substituted or unsubstituted $C_6$-$C_{10}$ arylene group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein n, m, l, k, α, β are each independently selected from 0 or 1;

wherein $R_{15}$, $R_{16}$, $R_{2a}$, $R_{2b}$, $R_a$, $R_b$, $R_c$, $R_d$, $R_{2c}$, $R_{2d}$, $R_{2e}$, and $R_{2f}$ are each independently selected from hydrogen, fluorine, a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group or a substituted or unsubstituted $C_3$-$C_{10}$ cycloalkyl group, and when substituted, the substituent is at least one of halogen, $C_1$-$C_6$ alkyl, $C_2$-$C_6$ alkenyl, and cyano;

wherein p, q, γ, β are each independently selected from an integer from 0 to 3;

wherein each number of Si in the compounds of Formula (I-A), and Formula (II-B) is 1 to 6;

wherein $R_{25}$ and $R_{26}$ are each independently selected from a substituted or unsubstituted $C_1$-$C_6$ alkylidene group or a substituted or unsubstituted $C_2$-$C_6$ alkenyl group, and when substituted, the substituent is at least one selected from halogen, $C_1$-$C_6$ alkyl, and $C_2$-$C_6$ alkenyl;

wherein $R_d$ and $R_{16}$, together with Si to which they are attached, optionally form a ring;

when l is 0, $R_a$, $R_b$ and $R_{15}$ are not hydrogen simultaneously;

when m is 0, $R_c$, $R_d$ and $R_{16}$ are not hydrogen simultaneously;

when α is 0, $R_{2a}$, $R_{2c}$ and $R_{2d}$ are not hydrogen simultaneously; and when β is 0, $R_{2b}$, $R_{2e}$ and $R_{2f}$ are not hydrogen simultaneously.

14. The electrochemical device according to claim 13, wherein the compound of Formula (I-A), the compound of Formula (II-A), the compound of Formula (II-B) or the compound of Formula (II-C) is at least one selected from:

Formula (I-1)

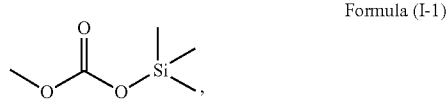

-continued

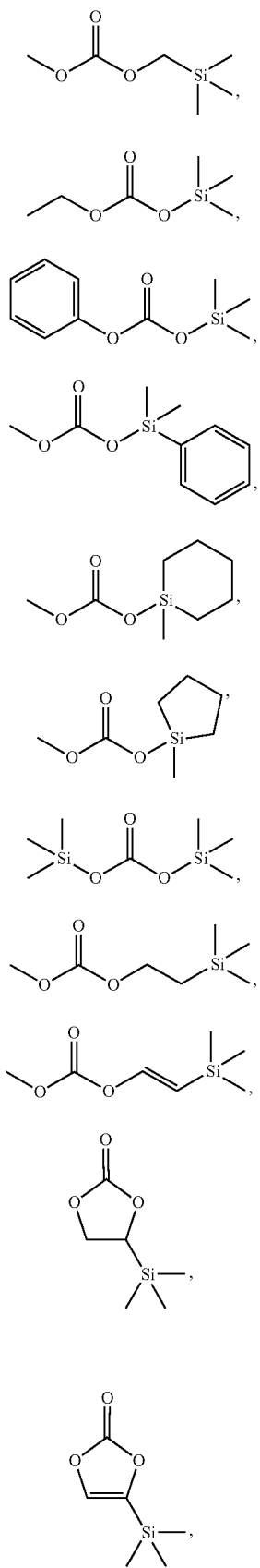

Formula (I-2)
Formula (I-3)
Formula (I-4)
Formula (I-5)
Formula (I-6)
Formula (I-7)
Formula (I-8)
Formula (I-9)
Formula (I-10)
Formula (II-1)
Formula (II-2)

-continued

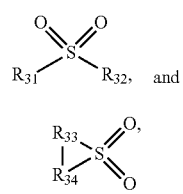

Formula (II-3)
Formula (II-4)
Formula (II-5)
Formula (II-6)

15. The electrochemical device according to claim 12, wherein the weight percentage of the carbonate compound having a silicon-containing functional group in the electrolytic solution is from about 0.005 wt % to about 70 wt %.

16. The electrochemical device according to claim 12, further comprising a compound having a sulfur-oxygen double bond, wherein the compound having a sulfur-oxygen double bond includes a compound of Formula (III-A), a compound of Formula (III-B), or any combination thereof:

$$R_{31}-\underset{\underset{O}{\overset{O}{\|}}}{S}-R_{32}, \quad \text{and}$$ Formula (III-A)

$$\underset{R_{34}}{\overset{R_{33}}{|}}S\underset{O}{\overset{O}{\diagup}}\!\!\!\diagdown,$$ Formula (III-B)

wherein $R_{31}$ and $R_{32}$ are each independently selected from a substituted or unsubstituted $C_1$-$C_5$ alkyl group, a substituted or unsubstituted $C_2$-$C_{10}$ alkenyl group, a substituted or unsubstituted $C_6$-$C_{10}$ aryl group or a substituted or unsubstituted $C_1$-$C_{10}$ alkyl group containing a heteroatom, in which the heteroatom is selected from O, S, and P, and when substituted, the substituent is one or more of halogen, nitro, cyano, carboxyl, and a sulfate group;

wherein $R_{33}$ and $R_{34}$ are each independently selected from a substituted or unsubstituted $C_1$-$C_4$ alkylene group, a substituted or unsubstituted $C_2$-$C_4$ alkenyl group, or a substituted or unsubstituted $C_1$-$C_6$ alkylene group containing a heteroatom, and when substituted, the substituent is at least one selected from halogen, $C_1$-$C_3$ alkyl, and $C_2$-$C_4$ alkenyl, and the heteroatom is selected from O, S, and P; and wherein the weight percentage of the compound having a sulfur-oxygen double bond in the electrolytic solution is from about 0.01 wt % to about 10 wt %.

17. The electrochemical device according to claim 16, wherein the compound having a sulfur-oxygen double bond is at least one selected from:

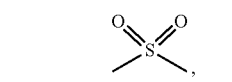

Formula (III-1)

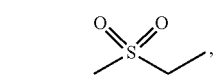

Formula (III-2)

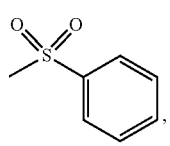

Formula (III-3)

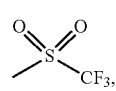

Formula (III-4)

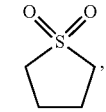

Formula (III-5)

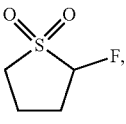

Formula (III-6)

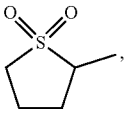

Formula (III-7)

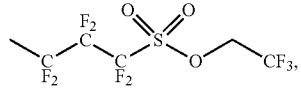

Formula (III-8)

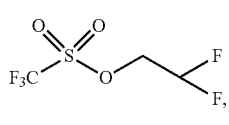

Formula (III-9)

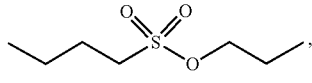

Formula (III-10)

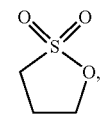

Formula (III-11)

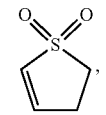

Formula (III-12)

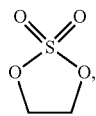

Formula (III-13)

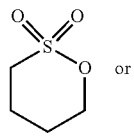

Formula (III-15)

or

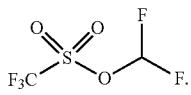

Formula (III-15)

18. The electrochemical device according to claim 12, further comprising a cyclic carbonate compound, which is a compound of Formula (IV-A):

Formula (IV-A)

wherein $R_4$ is selected from a substituted or unsubstituted $C_2$-$C_6$ alkylene group or a substituted or unsubstituted $C_2$-$C_6$ alkenyl group, and wherein the substituent is at least one selected from halogen, $C_1$-$C_6$ alkyl, and $C_2$-$C_6$ alkenyl, and wherein the weight percentage of the cyclic carbonate compound in the electrolytic solution is from about 0.01 wt % to about 30 wt %.

19. The electrochemical device according to claim 12, further comprising an aromatic compound, which is a compound of Formula (V-A):

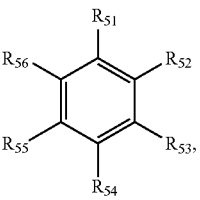

Formula (V-A)

wherein $R_{51}$, $R_{52}$, $R_{53}$, $R_{54}$, $R_{55}$ and $R_{56}$ are each independently selected from hydrogen, fluorine, a substituted or unsubstituted $C_1$-$C_{10}$ alkyl group, a substituted or unsubstituted $C_3$-$C_{10}$ cycloalkyl group, a substituted or unsubstituted $C_3$-$C_{10}$ cycloalkenyl group, a substituted or unsubstituted $C_2$-$C_{10}$ alkenyl group, a substituted or unsubstituted $C_6$-$C_{10}$ aryl group or a substituted or unsubstituted $C_3$-$C_6$ heterocyclic group, and the heteroatom in the heterocyclic group is selected from O, S, and P, and when substituted, the substituent is at least one of halogen, cyano, carboxyl, and a sulfate group.

20. The electrochemical device according to claim 12, further comprising a nitrile compound, wherein the nitrile compound includes a compound of Formula (VI-A), a compound of Formula (VI-B), or any combination thereof:

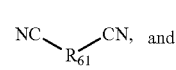 Formula (VI-A)

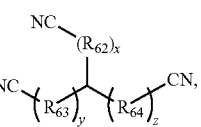 Formula (VI-B)

wherein $R_{61}$ is at least one selected from a substituted or unsubstituted alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group or a substituted or unsubstituted $C_6$-$C_{10}$ cycloalkyl group, and the substituent is at least one of halogen, $C_1$-$C_6$ alkyl, $C_2$-$C_6$ alkenyl, and cyano; and wherein $R_{62}$, $R_{63}$, and $R_{64}$ are each independently selected from a substituted or unsubstituted $C_1$-$C_{10}$ alkylene group, a substituted or unsubstituted $C_1$-$C_{10}$ alkyleneoxy group, a substituted or unsubstituted $C_2$-$C_{10}$ alkenyl group, a substituted or unsubstituted $C_6$-$C_{10}$ arylene group, a substituted or unsubstituted $C_6$-$C_{10}$ cycloalkyl group or a substituted or unsubstituted $C_3$-$C_6$ heterocyclic group, and the heteroatom in the heterocyclic group is selected from O, S, and P; and wherein x, y, and z are each independently selected from 0 or 1, and when substituted, the substituent is at least one of halogen, $C_1$-$C_6$ alkyl, $C_2$-$C_6$ alkenyl, and cyano.

\* \* \* \* \*